(12) United States Patent
Daczko et al.

(10) Patent No.: US 6,942,727 B2
(45) Date of Patent: Sep. 13, 2005

(54) HIGH EARLY-STRENGTH FIBER REINFORCED CEMENTITIOUS COMPOSITION

(75) Inventors: Joseph A. Daczko, Hiram, OH (US); Mark A. Kurtz, Garrettsville, OH (US); Michelle Dulzer, Cleveland, OH (US)

(73) Assignee: Construction Research & Technology GmbH, Trostberg (DE)

( * ) Notice: Subject to any disclaimer, the term of this patent is extended or adjusted under 35 U.S.C. 154(b) by 54 days.

(21) Appl. No.: 10/749,780

(22) Filed: Dec. 30, 2003

(65) Prior Publication Data

US 2005/0139129 A1 Jun. 30, 2005

(51) Int. Cl.$^7$ .............................................. C04B 24/04
(52) U.S. Cl. ...................... 106/724; 106/728; 106/823
(58) Field of Search ................. 106/724, 728, 106/823

(56) References Cited

U.S. PATENT DOCUMENTS

| | | | |
|---|---|---|---|
| 4,240,840 A | 12/1980 | Dowling et al. | |
| 4,559,881 A | 12/1985 | Lankard et al. | |
| 4,780,141 A | 10/1988 | Double et al. | |
| 4,902,347 A | 2/1990 | Soroushian et al. | |
| 4,979,992 A | 12/1990 | Bache | |
| 5,030,282 A | 7/1991 | Matsuhashi et al. | |
| 5,224,774 A | 7/1993 | Valle et al. | |
| 5,653,796 A | 8/1997 | Kawai et al. | |
| 5,792,252 A | 8/1998 | Sprouts | |
| 5,916,361 A | 6/1999 | Molloy et al. | |
| 6,296,698 B1 | 10/2001 | Naramoto et al. | |
| 6,478,867 B1 * | 11/2002 | Cheyrezy et al. | 106/644 |
| 6,503,318 B2 * | 1/2003 | Pye et al. | 106/716 |
| 6,723,162 B1 * | 4/2004 | Cheyrezy et al. | 106/644 |

FOREIGN PATENT DOCUMENTS

| | | | |
|---|---|---|---|
| WO | WO 2002016281 | * | 2/2002 |

OTHER PUBLICATIONS

Masamitsu, Eto, et al, Steel Fiber–Reinforced High–Fluidity High–Strength Concrete, Patent Abstracts of Japan, Publication No. 09–227191, Sep. 2, 1997.

* cited by examiner

*Primary Examiner*—Paul Marcantoni
(74) *Attorney, Agent, or Firm*—Curatolo Sidoti Co., LPA; Joseph G. Curatolo; James E. Oehlenschlager

(57) ABSTRACT

Reinforced high early-strength cementitious members are made from water and strength generating ingredients, which include a hydraulic cement, a polycarboxylate dispersant and structural synthetic fiber. The strength generating ingredients provide corrosion resistance by avoiding the use of steel reinforcing members, increased ductility and load bearing capacity while developing a high early-strength of at least about 1,400 pounds per square inch (psi) flexural strength and at least about 7,500 pounds per square inch (psi) compressive strength within about 24 hours after placing the cementitious composition in a mold.

84 Claims, No Drawings

HIGH EARLY-STRENGTH FIBER REINFORCED CEMENTITIOUS COMPOSITION

BACKGROUND

The production of cementitious members usually involves the incorporation of steel reinforcement. The reinforcement may be present as structural reinforcement due to the designed use of the member in which it is included, or the steel may simply be present to allow for a member (such as a curtain wall panel) to be stripped from its mold without cracking. The inclusion of steel reinforcement requires a minimal amount of concrete cover to reduce the potential for steel corrosion.

The typical production of pre-cast or tilt-up wall panels involves the casting of concrete into horizontally positioned forms out of which the hardened concrete piece is lifted. During this lifting or "stripping" of the forms, the concrete undergoes significant flexural and tensile stresses. To keep these wall panels from potentially cracking and breaking, continuous steel reinforcement is incorporated into the cast piece. ACI 318 section 7.7 provides guidelines for the amount of concrete cover (in terms of depth) which is required to cover the steel reinforcement so that the steel is protected from weather and other effects.

Depending upon the exposure of the concrete element and the type (size) of reinforcement used, a certain amount of cover is required. In some instances this can require that the thickness of the wall panel be greater than 4 inches. These wall panels are not structural pieces but simply architectural. The thickness of the pieces creates a heavier, less mobile and more expensive piece. This weight is taken into account when designing the support members for the building. The weight also limits the number of members that can be shipped at one time due to load restrictions on most roadways.

It would be desirable to produce a thinner, lighter panel that would allow for smaller dead loads on the building and increased shipping efficiencies. To withstand the stripping stresses as well as wind and other factors once in place, the thinner panel would need to have higher strength than the conventional, thicker panel. In the same way that these thinner panels (wall elements) use steel reinforcement and require a minimum of concrete cover, structural elements (both pre-cast and cast in place) will have similar requirements.

U.S. Pat. No. 4,559,881 discloses a concrete panel comprising: (a) Portland cement; (b) fly ash; (c) fine aggregate; (d) gravel (e) melamine superplasticizing water-reducing admixture; (f) and steel fibers.

U.S. Pat. No. 4,780,141 discloses a cementitious composite mixture which comprises: (a) Portland cement; (b) chemically reactive silica particles; (c) inorganic oxide particles; (d) aggregate particles; (e) metal fibers; (f) superplasticizer; and (g) water.

JP 9631029 discloses a concrete mixture composed of: (a) cement; (b) coarse aggregate; (c) fine aggregate; (d) steel fiber; (e) fly ash; (f) a high performance AE water reducing agent of polycarboxylic acid-base or napthalene-base; and (g) a thickening agent mainly containing methyl cellulose or a water-soluble polysaccharide.

What is needed in the industry is a cementitious composition that allows for lighter and stronger corrosion resistant members. This can be accomplished by the replacement of steel with structural synthetic fibers which will remove the potential for corrosion and will significantly increase the compressive and flexural strength, particularly at ages less than 24 hours, while lowering the amount of cementitious composition required.

SUMMARY

High early-strength reinforced pre-cast or cast in place cementitious members without metal bar, metal fiber or metal rod reinforcement are provided that comprise hydraulic cement, polycarboxylate dispersant, and structural synthetic fibers.

A high early-strength reinforced pre-cast or cast in place cementitious member is provided that comprises a cementitious composition containing hydraulic cement, polycarboxylate dispersant, and structural synthetic fibers wherein without metal bar, metal fiber or metal rod reinforcement the cementitious member develops a high early-strength of at least about 1,400 pounds per square inch (psi) flexural strength and at least about 7,500 pounds per square inch (psi) compressive strength within about 24 hours after placing the cementitious composition, unset but hydrated, in a mold.

Another embodiment provides a method of making a high early-strength reinforced pre-cast or cast in place member comprising preparing a high early-strength reinforced cementitious composition by mixing water and strength generating ingredients comprising, hydraulic cement, polycarboxylate dispersant, and structural synthetic fibers; and, forming a cementitious member without metal bar, metal fiber or metal rod reinforcement from the high early-strength reinforced cementitious composition wherein the cementitious member develops a high early-strength of at least about 1,400 pounds per square inch (psi) flexural strength and at least about 7,500 pounds per square inch (psi) compressive strength within about 24 hours after placing the cementitious composition in a mold.

In one embodiment the forming of the cementitious member is by one of placing the unset high early-strength reinforced cementitious composition of water and strength generating ingredients comprising, hydraulic cement, polycarboxylate dispersant, and structural synthetic fibers in a mold and vibrating said mold, then allowing the cementitious composition to cure or set into an article, followed by stripping the cured or set article from said mold.

Other embodiments include reinforced high early-strength cementitious compositions, comprising cementitious materials such as concretes, mortars and grouts, containing a hydraulic cement, preferably portland cement and a polycarboxylate dispersant.

DETAILED DESCRIPTION

A reinforced high early-strength cementitious member, and methods for preparing the reinforced high early-strength cementitious member are provided. Also corrosion resistance and increased ductility and load bearing capacity of the cementitious member are realized, while attaining high early compressive and flexural strength.

In the prior art, fibers such as steel fibers have been used to provide the reinforcement necessary for cementitious members. Corrosion of the steel fibers is of major concern as it can cause dangerous conditions such as reduced strength and flexibility of the cementitious members. To reduce the potential for corrosion, steel reinforcement requires a minimum amount of cementitious cover, resulting in members of a larger size than members prepared using a corrosion resistant cementitious composition. The replacement of steel fibers and steel rebar by structural synthetic fibers in cementitious members will prevent the potential for corrosion and permit reduction of the size of the cementitious members.

A significant advantage of not using steel rebar support is the reduction of cementitious member sizes, leading to reduced deadload on the structure, allowing for less or lower strength supporting cementitious members to be used, a reduced volume of cementitious composition needed to cast the smaller cementitious members, a reduced weight of the cementitious members cast, and, if they are pre-cast pieces, freight costs can be significantly reduced, coupled with reduced crane size for placing cementitious members on the structure.

To achieve the high strengths of these compositions, very low water to cement ratios are used. This necessitates a significant amount of high-range water reducer (HRWR) to produce a workable mixture. Conventional HRWR chemistry such as naphthalene will potentially retard set at such high dosages, and thereby inhibit the development of the high early strength necessary for stripping the member from the mold. In comparison, polycarboxylate dispersants develop strength quickly and do not have a retarding effect on cement hydration.

Typical high early-strength development is at least about 1400 pounds per square inch (psi) flexural strength and at least about 7,500 pounds per square inch (psi) compressive strength within about 24 hours after placing the unset cementitious composition in the mold.

In comparison to the compositions of the prior art where in some embodiments fibers in degradable bags were used to reinforce a cementitious composition, the increased strength of the present reinforced high early-strength cementitious member is not produced simply by the fibers but rather by a combination of strength generating ingredients and polycarboxylate dispersant, allowing for the production of thinner, lightweight sections that won't corrode.

In one embodiment a reinforced high early-strength cementitious composition is provided that comprises hydrated strength generating ingredients, comprising hydraulic cement, polycarboxylate dispersant and structural synthetic fibers.

To achieve a rapid level of strength development in the formation of cast or pre-cast cementitious members without an external heat source, traditional dispersant chemistries would not be successful because of their excessive retarding effect on cement hydration. In contrast polycarboxylate dispersants are successful because of their ability to develop strength quickly. To hasten the strength development of the cement, chemical set accelerators, both chloride and nonchloride-bearing additives, can be used successfully.

Polycarboxylate dispersants include polymers with a carbon backbone with pendant side chains, wherein at least a portion of the side chains are attached to the backbone through a carboxyl group or an ether group. Polycarboxylate dispersants are very effective in dispersing and reducing the water content in hydraulic cements. These dispersants operate by surrounding a particle to be dispersed, and then repulsion forces between each polymer chain keeps the particles apart and more fluid.

The term polycarboxylate dispersant used throughout this specification refers to polymers with a carbon backbone with pendant side chains, wherein at least a portion of the side chains are attached to the backbone through a carboxyl group or an ether group. The term dispersant is also meant to include those chemicals which also function as a plasticizer, water reducer, fluidizer, antiflocculating agent, or superplasticizer for cementitious compositions. Examples of polycarboxylate dispersants can be found in U.S. Pub. No. 2002/0019459 A1, U.S. Pat. No. 6,267,814, U.S. Pat. No. 6,290,770, U.S. Pat. No. 6,310,143, U.S. Pat. No. 6,187,841, U.S. Pat. No. 5,158,996, U.S. Pat. No. 6,008,275, U.S. Pat. No. 6,136,950, U.S. Pat. No. 6,284,867, U.S. Pat. No. 5,609,681, U.S. Pat. No. 5,494,516; U.S. Pat. No. 5,674,929, U.S. Pat. No. 5,660,626, U.S. Pat. No. 5,668,195, U.S. Pat. No. 5,661,206, U.S. Pat. No. 5,358,566, U.S. Pat. No. 5,162,402, U.S. Pat. No. 5,798,425, U.S. Pat. No. 5,612,396, U.S. Pat. No. 6,063,184, and U.S. Pat. No. 5,912,284, U.S. Pat. No. 5,840,114, U.S. Pat. No. 5,753,744, U.S. Pat. No. 5,728,207, U.S. Pat. No. 5,725,657, U.S. Pat. No. 5,703,174, U.S. Pat. No. 5,665,158, U.S. Pat. No. 5,643,978, U.S. Pat. No. 5,633,298, U.S. Pat. No. 5,583,183, and U.S. Pat. No. 5,393,343, which are all incorporated herein by reference. The polycarboxylate dispersant used in the cementitious composition may include but is not limited to dispersants or water reducers sold under the trademarks GLENIUM® 3030NS, GLENIUM® 3200 HES, GLENIUM 3000NS® (Master Builders Inc., Cleveland, Ohio), ADVA® (W. R. Grace Inc., Columbia, Md.), VISCOCRETE® (Sika, Stockholm, Sweden), and SUPERFLUX® (Axim Concrete Technologies Inc., Middlebranch, Ohio).

The dispersants used in the liquid coloring suspension can be at least one of the dispersant formulas a) through j):

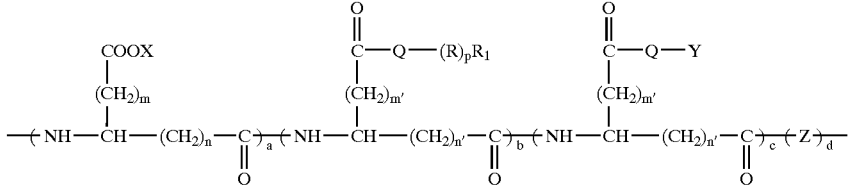

wherein in Formula (I)
X is at least one of hydrogen, an alkali earth metal ion, an alkaline earth metal ion, ammonium ion, or amine;
R is at least one of $C_1$ to $C_6$ alkyl(ene) ether or mixtures thereof or $C_1$ to $C_6$ alkyl(ene) imine or mixtures thereof;
Q is at least one of oxygen, NH, or sulfur;
p is a number from 1 to about 300 resulting in at least one of a linear side chain or branched side chain;
$R_1$ is at least one of hydrogen, $C_1$ to $C_{20}$ hydrocarbon, or functionalized hydrocarbon containing at least one of —OH, —COOH, an ester or amide derivative of —COOH, sulfonic acid, an ester or amide derivative of sulfonic acid, amine, or epoxy;

Y is at least one of hydrogen, an alkali earth metal ion, an alkaline earth metal ion, ammonium ion, amine, a hydrophobic hydrocarbon or polyalkylene oxide moiety that functions as a defoamer;

m, m', m", n, n', and n" are each independently 0 or an integer between 1 and about 20;

Z is a moiety containing at least one of i) at least one amine and one acid group, ii) two functional groups capable of incorporating into the backbone selected from the group consisting of dianhydrides, dialdehydes, and di-acid-chlorides, or iii) an imide residue; and wherein a, b, c, and d reflect the mole fraction of each unit wherein the sum of a, b, c, and d equal one, wherein a, b, c, and d are each a value greater than or equal to zero and less than one, and at least two of a, b, c, and d are greater than zero;

b) a dispersant of Formula (II):

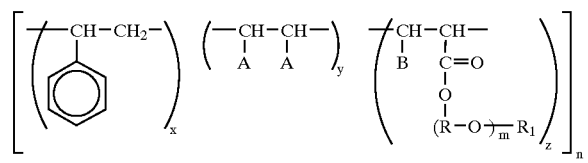

wherein in Formula (II):

A is COOM or optionally in the "y" structure an acid anhydride group (—CO—O—CO—) is formed in place of the A groups between the carbon atoms to which the A groups are bonded to form an anhydride;

B is COOM

M is hydrogen, a transition metal cation, the residue of a hydrophobic polyalkylene glycol or polysiloxane, an alkali metal ion, an alkaline earth metal ion, ferrous ion, aluminum ion, (alkanol)ammonium ion, or (alkyl)ammonium ion;

R is a $C_{2-6}$ alkylene radical;

R1 is a $C_{1-20}$ alkyl, $C_{6-9}$ cycloalkyl, or phenyl group;

x, y, and z are a number from 0.01 to 100;

m is a number from 1 to 100; and n is a number from 10 to 100;

c) a dispersant comprising at least one polymer or a salt thereof having the form of a copolymer of i) a maleic anhydride half-ester with a compound of the formula $RO(AO)_mH$, wherein R is a $C_1$–$C_{20}$ alkyl group, A is a $C_{2-4}$ alkylene group, and m is an integer from 2–16; and ii) a monomer having the formula $CH_2\!\!=\!\!CHCH_2\!\!-\!\!(OA)_n OR$, wherein n is an integer from 1–90 and R is a $C_{1-20}$ alkyl group;

d) a dispersant obtained by copolymerizing 5 to 98% by weight of an (alkoxy)polyalkylene glycol mono(meth)acrylic ester monomer (a) represented by the following general formula (1):

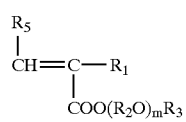

(1)

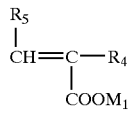

(2)

wherein $R_1$ stands for hydrogen atom or a methyl group, $R_2O$ for one species or a mixture of two or more species of oxyalkylene group of 2 to 4 carbon atoms, providing two or more species of the mixture may be added either in the form of a block or in a random form, $R_3$ for a hydrogen atom or an alkyl group of 1 to 5 carbon atoms, and m is a value indicating the average addition mol number of oxyalkylene groups that is an integer in the range of 1 to 100, 95 to 2% by weight of a (meth)acrylic acid monomer (b) represented by the above general formula (2), wherein $R_4$ and $R_5$ are each independently a hydrogen atom or a methyl group, and $M_1$ for a hydrogen atom, a monovalent metal atom, a divalent metal atom, an ammonium group, or an organic amine group, and 0 to 50% by weight of other monomer (c) copolymerizable with these monomers, provided that the total amount of (a), (b), and (c) is 100% by weight;

e) a graft polymer that is a polycarboxylic acid or a salt thereof, having side chains derived from at least one species selected from the group consisting of oligoalkyleneglycols, polyalcohols, polyoxyalkylene amines, and polyalkylene glycols;

f) a dispersant of Formula (III):

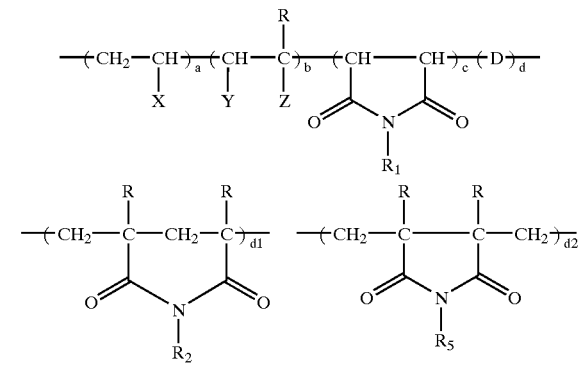

wherein in Formula (III):

D=a component selected from the group consisting of the structure d1, the structure d2, and mixtures thereof;

X=H, $CH_3$, $C_2$ to $C_6$ Alkyl, Phenyl, p-Methyl Phenyl, or Sulfonated Phenyl;

Y=H or —COOM;

R=H or $CH_3$;

Z=H, —$SO_3M$, —$PO_3M$, —COOM, —$O(CH_2)_nOR_3$ where n=2 to 6, —$COOR_3$, or —$(CH_2)_nOR_3$ where n=0 to 6, —$CONHR_3$, —$CONHC(CH_3)_2CH_2SO_3M$, —$COO(CHR_4)_nOH$ where n=2 to 6, or —$O(CH_2)_nOR_4$ wherein n=2 to 6;

$R_1, R_2, R_3, R_5$ are each independently —$(CHRCH_2O)_mR_4$ random copolymer of oxyethylene units and oxypropylene units where m=10 to 500 and wherein the amount of oxyethylene in the random copolymer is from about 60% to 100% and the amount of oxypropylene in the random copolymer is from 0% to about 40%;

$R_4$=H, Methyl, $C_2$ to about $C_6$ Alkyl, or about $C_6$ to about $C_{10}$ aryl;

M=H, Alkali Metal, Alkaline Earth Metal, Ammonium, Amine, triethanol amine, Methyl, or $C_2$ to about $C_6$ Alkyl;

a=0 to about 0.8;

b=about 0.2 to about 1.0;

c=0 to about 0.5;

d=0 to about 0.5; and wherein a, b, c, and d represent the mole fraction of each unit and the sum of a, b, c, and d is 1.0;

g) a dispersant of Formula (IV):

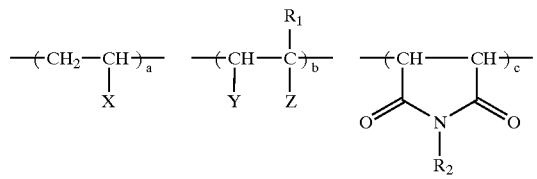

wherein in Formula (IV):

the "b" structure is one of a carboxylic acid monomer, an ethylenically unsaturated monomer, or maleic anhydride wherein an acid anhydride group (—CO—O—CO—) is formed in place of the groups Y and Z between the carbon atoms to which the groups Y and Z are bonded respectively, and the "b" structure must include at least one moiety with a pendant ester linkage and at least one moiety with a pendant amide linkage;

X=H, $CH_3$, $C_2$ to $C_6$ Alkyl, Phenyl, p-Methyl Phenyl, p-Ethyl Phenyl, Carboxylated Phenyl, or Sulfonated Phenyl;

Y=H, —COOM, —COOH, or W;

W=a hydrophobic defoamer represented by the formula $R_5O—(CH_2CH_2O)_s—(CH_2C(CH_3)HO)_t—(CH_2CH_2O)_u$ where s, t, and u are integers from 0 to 200 with the proviso that t>(s+u) and wherein the total amount of hydrophobic defoamer is present in an amount less than about 10% by weight of the polycarboxylate dispersant;

Z=H, —COOM, —O$(CH_2)_n$O$R_3$ where n=2 to 6, —COO$R_3$, —$(CH_2)_n$O$R_3$ where n=0 to 6, or —CONH$R_3$;

$R_1$H, or $CH_3$;

$R_2$, $R_3$, are each independently a random copolymer of oxyethylene units and oxypropylene units of the general formula —(CH($R_1$)CH$_2$O)$_m$R$_4$ where m=10 to 500 and wherein the amount of oxyethylene in the random copolymer is from about 60% to 100% and the amount of oxypropylene in the random copolymer is from 0% to about 40%;

$R_4$=H, Methyl, or $C_2$ to $C_8$ Alkyl;

$R_4$=$C_1$ to $C_{18}$ alkyl or $C_6$ to $C_{18}$ alkyl aryl;

M=Alkali Metal, Alkaline Earth Metal, Ammonia, Amine, monoethanol amine, diethanol amine, triethanol amine, morpholine, imidazole;

a=0.01–0.8;

b=0.2–0.99;

c=0–0.5; and wherein a, b, c represent the mole fraction of each unit and the sum of a, b, and c, is 1;

h) a random copolymer corresponding to the following Formula (V) in free acid or salt form having the following monomer units and numbers of monomer units:

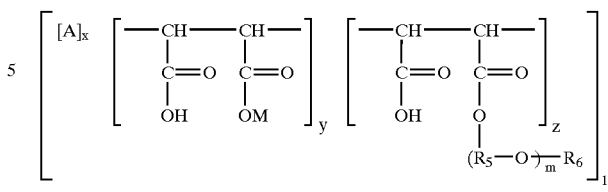

wherein A is selected from the moieties (i) or (ii)

(i) —CR$_1$R$_2$—CR$_3$R$_4$—

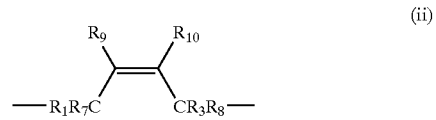

wherein $R_1$ and $R_3$ are selected from substituted benzene, $C_{1-8}$ alkyl, $C_{2-8}$ alkenyl, $C_{2-8}$ alkylcarbonyl, $C_{1-8}$ alkoxy, carboxyl, hydrogen, and a ring, $R_2$ and $R_4$ are selected from the group consisting of hydrogen and $C_{1-4}$ alkyl, wherein $R_1$ and $R_3$ can together with $R_2$ and/or $R_4$ when $R_2$ and/or $R_4$ are $C_{1-4}$ alkyl form the ring;

$R_7$, $R_8$, $R_9$, and $R_{10}$ are individually selected from the group consisting of hydrogen, $C_{1-6}$ alkyl, and a $C_{2-8}$ hydrocarbon chain, wherein $R_1$ and $R_3$ together with $R_7$ and/or $R_8$, $R_9$, and $R_{10}$ form the $C_{2-8}$ hydrocarbon chain joining the carbon atoms to which they are attached, the hydrocarbon chain optionally having at least one anionic group, wherein the at least one anionic group is optionally sulfonic;

M is selected from the group consisting of hydrogen, and the residue of a hydrophobic polyalkylene glycol or a polysiloxane, with the proviso that when A is (ii) and M is the residue of a hydrophobic polyalkylene glycol, M must be different from the group —(R$_5$O)$_m$R$_6$;

$R_5$ is a $C_{2-8}$ alkylene radical;

$R_6$ is selected from the group consisting of $C_{1-20}$ alkyl, $C_{6-9}$ cycloalkyl and phenyl;

n, x, and z are numbers from 1 to 100;

y is 0 to 100;

m is 2 to 1000;

the ratio of x to (y+z) is from 1:10 to 10:1 and the ratio of y:z is from 5:1 to 1:100;

i) a copolymer of oxyalkyleneglycol-alkenyl ethers and unsaturated dicarboxylic acids, comprising:

i) 0 to 90 mol % of at least one component of the formula 3a or 3b:

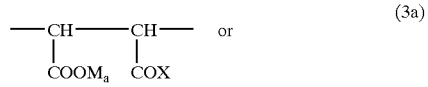

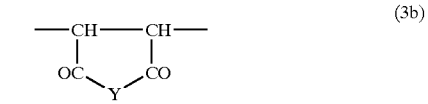

wherein M is a hydrogen atom, a mono- or divalent metal cation, an ammonium ion or an organic amine residue, a is 1, or when M is a divalent metal cation a is ½;

wherein X is —OM$_a$,

—O—$(C_mH_{2m}O)_n$—$R^1$ in which $R^1$ is a hydrogen atom, an aliphatic hydrocarbon radical containing from 1 to 20 carbon atoms, a cycloaliphatic hydrocarbon radical containing 5 to 8 carbon atoms or an optionally hydroxyl, carboxyl, $C_{1-14}$ alkyl, or sulphonic substituted aryl radical containing 6 to 14 carbon atoms, m is 2 to 4, and n is 0 to 100, —$NHR_2$, —$N(R^2)_2$ or mixtures thereof in which $R^2=R^1$ or —CO—$NH_2$; and wherein Y is an oxygen atom or —$NR^2$;

ii) 1 to 89 mol % of components of the general formula 4:

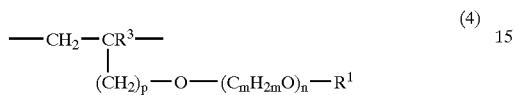
(4)

wherein $R_3$ is a hydrogen atom or an aliphatic hydrocarbon radical containing from 1 to 5 carbon atoms, p is 0 to 3, and $R_1$ is hydrogen, an aliphatic hydrocarbon radical containing from 1 to 20 carbon atoms, a cycloaliphatic hydrocarbon radical containing 5 to 8 carbon atoms or an optionally hydroxyl, carboxyl, $C_{1-14}$ alkyl, or sulfonic substituted aryl radical containing 6 to 14 carbon atoms, m is 2 to 4, and n is 0 to 100, and iii) 0.1 to 10 mol % of at least one component of the formula 5a or 5b:

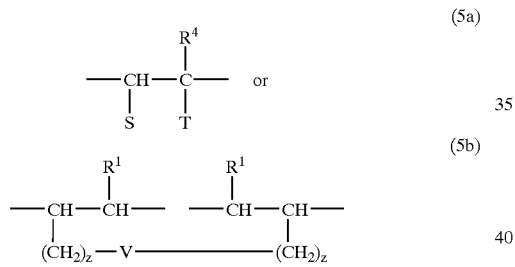
(5a)

(5b)

wherein S is a hydrogen atom or —$COOM_a$ or —$COOR_5$, T is —$COOR_5$, —W—$R_7$, —CO—[—NH—(CH2)3)-]$_s$-W—$R_7$, —CO—O—$(CH_2)_z$—W—$R_7$, a radical of the general formula:

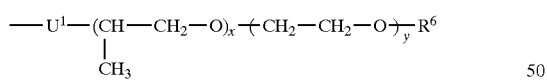

or —$(CH_2)_z$—V—$(CH_2)_z$—CH=CH—$R_1$, or when S is —$COOR_5$ or —$COOM_a$, $U_1$ is —CO—NHM-, —O— or —$CH_2O$, $U_2$ is —NH—CO—, —O— or —$OCH_2$, V is —O—CO—$C_6H_4$—CO—O— or —W—, and W is

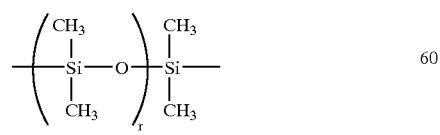

$R_4$ is a hydrogen atom or a methyl radical, $R_5$ is an aliphatic hydrocarbon radical containing 3 to 20 carbon atoms, a cycloaliphatic hydrocarbon radical containing 5 to 8 carbon atoms or an aryl radical containing 6 to 14 carbon atoms, $R_6=R_1$ or

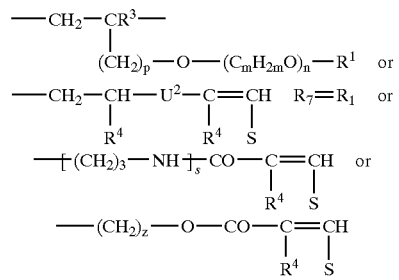

r is 2 to 100, s is 1 or 2, x is 1 to 150, y is 0 to 15 and z is 0 to 4;

iv) 0 to 90 mol % of at least one component of the formula 6a, 6b, or 6c:

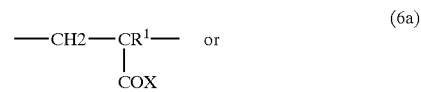
(6a)

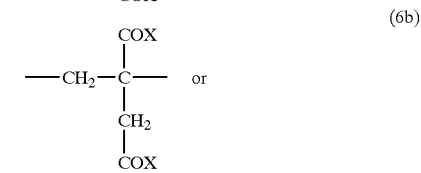
(6b)

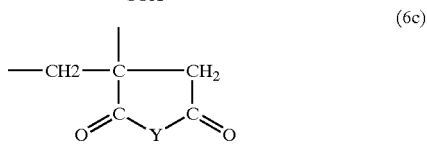
(6c)

wherein M is a hydrogen atom, a mono- or divalent metal cation, an ammonium ion or an organic amine residue, a is 1, or when M is a divalent metal cation a is ½;

wherein X is —$OM_a$,

—O—$(C_mH_{2m}O)_n$—$R^1$ in which $R^1$ is a hydrogen atom, an aliphatic hydrocarbon radical containing from 1 to 20 carbon atoms, a cycloaliphatic hydrocarbon radical containing 5 to 8 carbon atoms or an optionally hydroxyl, carboxyl, $C_{1-14}$ alkyl, or sulphonic substituted aryl radical containing 6 to 14 carbon atoms, m is 2 to 4, and n is 0 to 100, —NH—$(C_mH_{2m}O)_n$—$R^1$, $NHR_2$, —$N(R^2)_2$ or mixtures thereof in which $R^2=R^1$ or —CO—$NH_2$; and wherein Y is an oxygen atom or —$NR^2$;

j) a copolymer of dicarboxylic acid derivatives and oxyallylene glycol-alkenyl ethers, comprising:

i) 1 to 90 mol. % of at least one member selected from the group consisting of structural units of formula 7a and formula 7b:

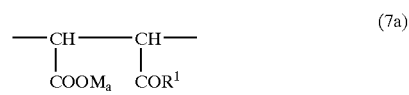
(7a)

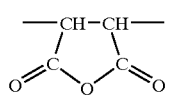

(7b)

wherein M is H, a monovalent metal cation, a divalent metal cation, an ammonium ion or an organic amine;

a is ½ when M is a divalent metal cation or 1 when M is a monovalent metal cation;

wherein $R^1$ is —$OM_a$, or
—O—$(C_mH_{2m}O)_n$—$R^2$ wherein $R^2$ is H, a $C_{1-20}$ aliphatic hydrocarbon, a $C_{5-8}$ cycloaliphatic hydrocarbon, or a $C_{6-14}$ aryl that is optionally substituted with at least one member selected from the group consisting of [—$COOM_a$, —$(SO_3)M_a$, and —$(PO_3)M_{a2}$];

m is 2 to 4;

n is 1 to 200;

ii) 0.5 to 80 mol. % of the structural units of formula 8:

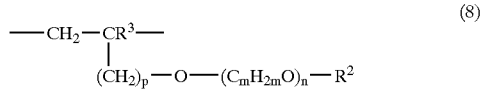

(8)

wherein $R^3$ is H or a $C_{1-5}$ aliphatic hydrocarbon;

p is 0 to 3;

$R_2$ is H, a $C_{1-20}$ aliphatic hydrocarbon, a $C_{5-8}$ cycloaliphatic hydrocarbon, or a $C_{6-14}$ aryl that is optionally substituted with at least one member selected from the group consisting of [—$COOM_a$, —$(SO_3)M_a$, and —$(PO_3)M_{a2}$];

m is 2 to 4;

n is 1 to 200;

iii) 0.5 to 80 mol. % structural units selected from the group consisting of formula 9a and formula 9b:

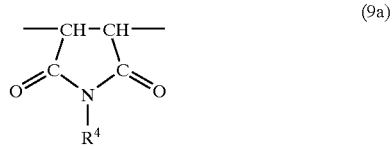

(9a)

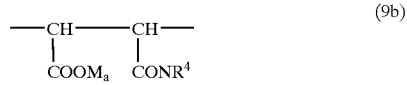

(9b)

wherein $R^4$ is H, $C_{1-20}$ aliphatic hydrocarbon that is optionally substituted with at least one hydroxyl group, —$(C_mH_{2m}O)_n$—$R^2$, —CO—NH—$R^2$, $C_{5-8}$ cycloaliphatic hydrocarbon, or a $C_{6-14}$ aryl that is optionally substituted with at least one member selected from the group consisting of [—$COOM_a$, —$(SO_3)M_a$, and —$(PO_3)M_{a2}$];

M is H, a monovalent metal cation, a divalent metal cation, an ammonium ion or an organic amine;

a is ½ when M is a divalent metal cation or 1 when M is a monovalent metal cation;

$R^2$ is H, a $C_{1-20}$ aliphatic hydrocarbon, a $C_{5-8}$ cycloaliphatic hydrocarbon, or a $C_{6-14}$ aryl that is optionally substituted with at least one member selected from the group consisting of [—$COOM_a$, —$(SO_3)M_a$, and —$(PO_3)M_{a2}$];

m is 2 to 4;

n is 1 to 200;

iv) 1 to 90 mol. % of structural units of formula 10

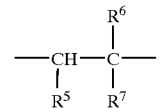

(10)

wherein $R^5$ is methyl, or methylene group, wherein $R^5$ forms one or more 5 to 8 membered rings with $R^7$;

$R^6$ is H, methyl, or ethyl;

$R^7$ is H, a $C_{1-20}$ aliphatic hydrocarbon, a $C_{6-14}$ aryl that is optionally substituted with at least one member selected from the group consisting of [—$COOM_a$, —$(SO_3)M_a$, and —$(PO_3)M_{a2}$], a $C_{5-8}$ cycloaliphatic hydrocarbon, —$OCOR^4$, —$OR^4$, or —$COOR^4$, wherein $R^4$ is H, a $C_{1-20}$ aliphatic hydrocarbon that is optionally substituted with at least one —OH, —$(C_mH_{2m}O)_n$—$R^2$, —CO—NH—$R^2$, $C_{5-8}$ cycloaliphatic hydrocarbon, or a $C_{6-14}$ aryl residue that is optionally substituted with a member selected from the group consisting of [—$COOM_a$, —$(SO_3)M_a$, —$(PO_3)M_{a2}$].

In formula (e) the word "derived" does not refer to derivatives in general, but rather to any polycarboxylic acid/salt side chain derivatives of oligoalkyleneglycols, polyalcohols and polyalkylene glycols that are compatible with dispersant properties and do not destroy the graft polymer.

The preferred substituents in the optionally substituted aryl radical of formula (i), containing 6 to 14 carbon atoms, are hydroxyl, carboxyl, $C_{1-14}$ alkyl, or sulfonate groups.

The preferred substituents in the substituted benzene are hydroxyl, carboxyl, $C_{1-14}$ alkyl, or sulfonate groups.

The fibers are preferably made of polypropylene, but can be made of glass, carbon, or other synthetic materials including nylon, polyethylene, polyester, rayon, and mixtures thereof. The prior art fiber reinforced cementitious compositions contain microfibers which provide some crack resistance but do not have the capability to carry load when structural cracking occurs. In contrast the macro or structural fibers used in the reinforced cementitious members provide post-cracking ductility, in that they are capable of bearing load when structural cracking occurs in a reinforced cementitious member. The fibers generally have an average diameter of greater than about 0.6 millimeters, such as about 0.6 to about 1.2 millimeters, preferably about 0.8 to about 1.0 millimeter, and an average length of greater than about 15 millimeters, such as about 15 millimeters to about 75 millimeters. The modulus of the fibers may be about 3,000 N/mm² or higher, such as about 3,000 to about 4,000 N/mm², but preferably about 3,250 to about 3,750 N/mm². An example, but not a limitation, of polypropylene fibers is HPP 50 MM or HPP 30 MM polypropylene fibers (Synthetic Industries, Chattanooga, Tenn.).

The hydraulic cement comprising the cementitious composition is selected from the group consisting of portland cement, modified portland cement, or masonry cement, and mixtures thereof. By portland cement is meant all cementitious compositions which have a high content of tricalcium silicate and includes portland cement and cements that are chemically similar or analogous to portland cement, the specification for which is set forth in ASTM specification C 150-00.

Cementitious materials are materials that alone have hydraulic cementing properties, and set and harden in the presence of water. Included in cementitious materials are ground granulated blast-furnace slag, natural cement, hydraulic hydrated lime, and combinations of these and other materials.

The cementitious composition described herein may contain other additives or ingredients and should not be limited to the stated formulations. Cement additives that can be added include, but are not limited to: set accelerators, set retarders, air-entraining or air detraining agents, water reducers, wetting agents, water soluble polymers, strength enhancing agents, rheology modifying agents, water repellents, dampproofing admixtures, gas formers, permeability reducers, pumping aids, fungicidal admixtures, germicidal admixtures, insecticidal admixtures, finely divided mineral admixtures, alkali-reactivity reducer, bonding admixtures, shrinkage compensation admixtures, aggregate, pozzolan and any other admixture or additive that does not adversely affect the properties of the above described cementitious composition or cementitious member.

A set accelerator that can be used in the admixture can include, but is not limited to, a nitrate salt of an alkali metal, alkaline earth metal, or aluminum; a nitrite salt of an alkali metal, alkaline earth metal, or aluminum; a thiocyanate of an alkali metal, alkaline earth metal or aluminum; an alkanolamine; a thiosulfate of an alkali metal, alkaline earth metal, or aluminum; a hydroxide of an alkali metal, alkaline earth metal, or aluminum; a carboxylic acid salt of an alkali metal, alkaline earth metal, or aluminum (preferably calcium formate); a polyhydroxylalkylamine; a halide salt of an alkali metal or alkaline earth metal (preferably bromide). Examples of set accelerators particularly suitable for use in the present invention include, but are not limited to, POZZOLITH® NC534, nonchloride type set accelerator and/or RHEOCRETE® CNI calcium nitrite-based corrosion inhibitor both sold under the trademarks by Master Builders Inc. of Cleveland, Ohio.

The salts of nitric acid have the general formula $M(NO_3)_a$ where M is an alkali metal, or an alkaline earth metal or aluminum, and where a is 1 for alkali metal salts, 2 for alkaline earth salts, and 3 for aluminum salts. Preferred are nitric acid salts of Na, K, Mg, Ca and Al.

Nitrite salts have the general formula $M(NO_2)_a$ where M is an alkali metal, or an alkaline earth metal or aluminum, and where a is 1 for alkali metal salts, 2 for alkaline earth salts, and 3 for aluminum salts. Preferred are nitric acid salts of Na, K, Mg, Ca and Al.

The salts of the thiocyanic acid have the general formula $M(SCN)_b$, where M is an alkali metal, or an alkaline earth metal or aluminum, and where b is 1 for alkali metal salts, 2 for alkaline earth salts and 3 for aluminum salts. These salts are variously known as sulfocyanates, sulfocyanides, rhodanates or rhodanide salts. Preferred are thiocyanic acid salts of Na, K, Mg, Ca and Al.

Alkanolamine is a generic term for a group of compounds in which trivalent nitrogen is attached directly to a carbon atom of an alkyl alcohol. A representative formula is $N[H]_c[(CH_2)_d CH_2OH]_e$, where c is 3-e, d is 1 to about 5 and e is 1 to about 3. Examples include, but are not limited to, are monoethanoalamine, diethanolamine and triethanolamine.

The thiosulfate salts have the general formula $M_f(S_2O_3)_g$ where M is alkali metal or an alkaline earth metal or aluminum, and f is 1 or 2 and g is 1, 2 or 3, depending on the valencies of the M metal elements. Preferred are thiosulfate acid salts of Na, K, Mg, Ca and Al.

The carboxylic acid salts have the general formula RCOOM wherein R is H or $C_1$ to about $C_{10}$ alkyl, and M is alkali metal or an alkaline earth metal or aluminum. Preferred are carboxylic acid salts of Na, K, Mg, Ca and Al. A preferred carboxylic acid salt is calcium formate.

A preferred polyhydroxylallylamine has the general formula

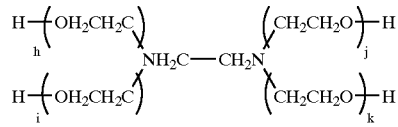

wherein h is 1 to 3, i is 1 to 3, j is 1 to 3, and k is 0 to 3. A preferred polyhydroxyalkylamine is tetrahydroxyethylethylenediamine.

Set retarding, or also known as delayed-setting or hydration control, admixtures are used to retard, delay, or slow the rate of setting of concrete. They can be added to the concrete mix upon initial batching or sometime after the hydration process has begun. Set retarders are used to offset the accelerating effect of hot weather on the setting of concrete, or delay the initial set of concrete or grout when difficult conditions of placement occur, or problems of delivery to the job site, or to allow time for special finishing processes. Most set retarders also act as low level water reducers and can also be used to entrain some air into concrete. Lignosulfonates, hydroxylated carboxylic acids, borax, gluconic, tartaric and other organic acids and their corresponding salts, phosphonates, certain carbohydrates such as sugars and sugar-acids and mixtures thereof can be used as retarding admixtures.

Air detrainers are used to decrease the air content in the cementitious composition. Examples of air detrainers that can be utilized in the cementitious member include, but are not limited to tributyl phosphate, dibutyl phthalate, octyl alcohol, water-insoluble esters of carbonic and boric acid, acetylenic diols, ethylene oxide-propylene oxide block copolymers and silicones.

Dampproofing admixtures reduce the permeability of concrete that has low cement contents, high water-cement ratios, or a deficiency of fines in the aggregate portion. These admixtures retard moisture penetration into dry concrete and include certain soaps, stearates, and petroleum products.

Permeability reducers are used to reduce the rate at which water under pressure is transmitted through concrete. Silica fume, fly ash, ground slag, metakaolin, natural pozzolans, water reducers, and latex can be employed to decrease the permeability of the concrete.

Bacterial growth, fungal growth, and insect infestation on or in hardened concrete may be partially controlled through the use of fungicidal, germicidal, and insecticidal admixtures. The most effective materials for these purposes are polyhalogenated phenols, dialdrin emulsions, and copper compounds.

Finely divided mineral admixtures are materials in powder or pulverized form added to concrete before or during the mixing process to improve or change some of the plastic or hardened properties of portland cement concrete. Portland cement, as used in the trade, means a hydraulic cement produced by pulverizing clinker, comprising hydraulic calcium silicates, calcium aluminates, and calcium aluminoferrites, and usually containing one or more of the forms of calcium sulfate as an interground addition. Portland cements are classified in ASTM C 150 as Type I, II, III, IV, or V. The finely divided mineral admixtures can be classified according to their chemical or physical properties as: cementitious materials; pozzolans; pozzolanic and cementitious materials; and nominally inert materials.

A pozzolan is a siliceous or aluminosiliceous material that possesses little or no cementitious value but will, in the presence of water and in finely divided form, chemically react with the calcium hydroxide produced during the hydration of portland cement to form materials with cementitious properties. Diatomaceous earth, opaline cherts, clays, shales, fly ash, silica fume, volcanic tuffs and pumicites are some of the known pozzolans. Certain ground granulated blast-furnace slags and high calcium fly ashes possess both pozzolanic and cementitious properties. Natural pozzolan is a term of art used to define the pozzolans that occur in nature, such as volcanic tuffs, pumices, trasses, diatomaceous earths, opaline, cherts, and some shales. Nominally inert materials can also include finely divided raw quartz, dolomites, limestones, marble, granite, and others. Fly ash is defined in ASTM C618.

Alkali-reactivity reducers can reduce the alkali-aggregate reaction and limit the disruptive expansion forces that this reaction can produce in hardened concrete. Pozzolans (fly ash, silica fume), blast-furnace slag, salts of lithium and barium are especially effective.

The shrinkage compensation agent which can be used in the cementitious composition can include but is not limited to RO(AO)′1-10H, wherein R is a $C_{1-5}$ alkyl or $C_{5-6}$ cycloalkyl radical and A is a $C_{2-3}$ alkylene radical, alkali metal sulfate, alkaline earth metal sulfates, alkaline earth oxides, preferably sodium sulfate and calcium oxide. TETRAGUARD® shrinkage reducing agent is preferred and is available from Master Builders Inc. of Cleveland, Ohio.

Aggregate can be included in the cementitious composition to provide for mortars which include fine aggregate, and concretes which also include coarse aggregate. The fine aggregate are materials that almost entirely pass through a Number 4 sieve (ASTM C 125 and ASTM C 33), such as silica sand. The coarse aggregate are materials that are predominantly retained on a Number 4 sieve (ASTM C 125 and ASTM C 33), such as silica, quartz, crushed round marble, glass spheres, granite, limestone, calcite, feldspar, alluvial sands, sands or any other durable aggregate, and mixtures thereof.

The reinforced high early-strength cementitious composition can also include a defoamer such as modified silicones or petroleum oil mixtures. A preferred defoamer is FOAMASTER™ S available from Cognis Corporation, Cincinnati, Ohio.

A method is provided for preparing the reinforced high early-strength cementitious composition which has acceptable corrosion resistance and high early compressive and flexural strength. The process includes mixing the reinforced high-strength cementitious composition, typically with a high cementitious materials content and low water to cementitious materials ratio, coupled with structural synthetic fibers. Therefore, the cementitious composition contains the structural synthetic fibers and polycarboxylate dispersant and a hydraulic cement, such as portland cement, mixed with water and other additives, optionally including additives to control excessive shrinkage and/or alkali-silica reaction.

In one embodiment, the dosages of the components of the reinforced early high-strength cementitious composition, polycarboxylate dispersant and structural synthetic fibers are governed by factors such as cement type and reactivity, ambient temperature, and cementitious material mixture proportions. Preferred dosages include but are not limited to: polycarboxylate dispersant with a solids content of about 20% to about 30% may be present in an amount from about 5 to about 35 oz/cwt, wherein the primary active ingredient of the polycarboxylate high range water reducing dispersant is about 0.025% to about 0.7% based on the dry weight of the cement, structural fiber loadings of about 1% to about 10% by volume of the mixture, a cementitious materials content of about 800 to about 1600 $lb/yd^3$, and the water to cementitious materials ratio may be generally about 0.2 to about 0.35.

A method is provided for making cast in place and pre-cast cementitious members. The method comprises mixing hydraulic cement, such as portland cement, structural synthetic fibers and the above polycarboxylate dispersant with water, and optionally coarse aggregate, fine aggregate, other additives, including additives to control excessive shrinkage and/or alkali-silica reaction, then forming the member from the mixture. Forming can be any conventional method, including placing the mixture in a mold to set or cure and stripping away mold.

The pre-cast cementitious members formed by the above method can be used in any application but are preferably useful for architectural, structural and no-structural applications. As an example and not a limitation, the articles can be formed as wall panels, beams, columns or the like.

It is possible to achieve very rapid strength development using a Type I cement, especially one that contained high amounts of tricalcium aluminate. To control shrinkage and minimize water demand, a larger coarse aggregate topsize could be used. To minimize the likelihood of alkali-silica reaction (ASR) or sulfate attack, fly ash, ground granulated blast furnace slag, metakaolin and/or silica fume could be used in the cementitious mixture.

Examples of the present reinforced high early-strength cementitious members made by the disclosed method were tested for flexural strength, compressive strength, slump, residual strength and ductility. In examples 1–4 in Table 1, the cementitious composition included a polycarboxylate dispersant particularly GLENIUM® 3000NS high range water-reducing admixture and HPP 50 MM structural plastic fibers. In examples 5–10 in Table 3, the cementitious composition included a polycarboxylate dispersant, particularly GLENIUM® 3000NS high range water reducing admixture and HPP 50 MM or HPP 30 MM structural plastic fibers. The results of flexural strength, compressive strength, residual strength and ductility of the reinforced high early-strength cementitious composition at 24-hours using ASTM test methods are set forth in Tables 2 and 4 below.

TABLE 1

| Mix | HPP 50 MM (Fiber %) | Dispersant (oz/cwt) | Cement (lb/yd3) | Fine Aggregate (lb/yd3) | $H_2O$ (lb/yd3) |
|---|---|---|---|---|---|
| 1 | 3.75 | 22 | 1382 | 2045 | 387 |
| 2 | 3.75 | 22 | 1382 | 2045 | 387 |
| 3 | 3.75 | 22 | 1382 | 2045 | 387 |
| 4 | 3.75 | 30 | 1371 | 2201 | 307 |

TABLE 2

| Mix ID | Slump, in | 24 hr Compressive Strength psi | 24 hr Flexural Strength psi | C1018 R(5,10) | C1018 R(10,20) | C1018 First Crack |
|---|---|---|---|---|---|---|
| 1 | 8.5 | 8670 | 1585 | 98.6 | 122.8 | 1188.3 |
| 2 | 8 | 8010 | 1600 | 107.4 | 127 | 1187.6 |
| 3 | 6.5 | 7830 | 1465 | 103.3 | 128 | 1201.1 |
| 4 | 2.5 | 9180 | 1740 | 86 | 107.8 | 1643.6 |

As illustrated by the test results of ASTM C1018 which evaluates the flexural performance of toughness parameters of cementitious members derived from the fiber-reinforced cementitious composition in Table 2, the cementitious composition demonstrates that plastic (synthetic) fibers provide an acceptable level of ductility to members (that is, levels around or above 100). This ductility is coupled with a high flexural strength at 24 hours.

TABLE 3

| Mix | HPP 50 MM (Fiber %) | HPP 30 MM (Fiber %) | Dispersant (oz/cwt) | Cement (lb/yd³) | Fine Aggregate (lb/yd³) | H₂O (lb/yd³) |
|---|---|---|---|---|---|---|
| 5 | 7 | | 46 | 1279 | 2132 | 282 |
| 6 | 4.8 | | 49 | 1362 | 2336 | 300 |
| 7 | 2.4 | | 51 | 1375 | 2357 | 303 |
| 8 | | 2.4 | 51 | 1362 | 2336 | 300 |
| 9 | | 4.8 | 51 | 1350 | 2315 | 297 |
| 10 | | 7 | 51 | 1307 | 2178 | 288 |

Dispersant = GLENIUM ® 300
HPP 30 MM FIBERS = Structural Plastic Fibers
HPP 50 MM FIBERS = Strutcural Plastic Fibers

TABLE 4

| Mix | Slump, in. | 24 hr Compressive Strength psi | 28 Day Compressive Strength psi | 24 hr Flexural Strength psi | 28 Day Flexural Strength psi |
|---|---|---|---|---|---|
| 5 | 1 | 7820 | 11729 | 1715 | 2235 |
| 6 | 2.75 | 10320 | 13561 | 1745 | 2965 |
| 7 | 8 | 9760 | 13338 | 1820 | 2820 |
| 8 | 8.75 | 9490 | 12472 | 2035 | 2605 |
| 9 | 8.75 | 8833 | 12097 | 1665 | 2690 |
| 10 | 4.5 | 7310 | 11119 | N/A | 2735 |

Table 4 illustrates that the HPP 30 MM and HPP 50 MM plastic (synthetic) structural fibers have no negative effect on the cementitious composition members in that the sample mixtures containing them have acceptable levels of flexural strength at 24 hours and at 28 days. Additionally, there is no difference between the fibers in that the samples containing the HPP 30 MM fibers had the same amount of flexural strength as those samples with equivalent amounts of HPP 50 MM fibers.

The flexural strength testing for the mixtures in Tables 2 and 4 was not a standard test with respect to specimen size. The specimens were 1.5" thick to simulate the thinner wall panels used in construction, whereas, the typical flexural strength specimen is 6" thick. The difference in size does affect the numerical value of the test in that thinner specimens will typically test higher in strength.

As demonstrated above, pre-cast cementitious members are provided that are light-weight, corrosion resistant, reinforced, and have high early-strength. The cementitious members are lighter and at least equal in strength to conventional pre-cast cementitious members. These qualities are attributable to the reinforced corrosion resistant cementitious composition that develops high early-strength and contains a combination of a polycarboxylate dispersant with a structural synthetic fiber to allow for low water to cement ratios and to achieve high strength.

It will be understood that the embodiment(s) described herein is/are merely exemplary, and that one skilled in the art may make variations and modifications without departing from the spirit and scope of the invention. All such variations and modifications are intended to be included within the scope of the invention as described hereinabove. Further all embodiments disclosed are not necessarily in the alternative, as various embodiments of the invention may be combined to provide the desired characteristics.

We claim:

1. A high early-strength reinforced pre-cast or cast in place cementitious member comprising a cementitious composition containing:
   (a) hydraulic cement;
   (b) polycarboxylate dispersant; and
   (c) structural synthetic fibers;
   wherein without metal bar, metal fiber or metal rod reinforcement the cementitious member develops a high early-strength of at least about 1,400 pounds per square inch (psi) flexural strength and at least about 7,500 pounds per square inch (psi) compressive strength within about 24 hours after placing the cementitious composition, unset but hydrated, in a mold.

2. The cementitious member of claim 1 wherein the member is prepared by mixing water and hydraulic cement, polycarboxylate dispersant, and structural synthetic fibers, wherein the water to cement ratio is about 0.2 to about 0.35.

3. The cementitious member of claim 1 wherein the cementitious materials content is about 800 lb/yd³ to about 1,600 lb/yd³.

4. The cementitious member of claim 1 wherein the structural synthetic fibers are at least one of structural plastic fibers, carbon, glass, or mixtures thereof.

5. The cementitious member of claim 4 wherein the structural plastic fibers are at least one of polyethylene, polyester, rayon, or mixtures thereof.

6. The cementitious member of claim 1 wherein the structural synthetic fibers have a diameter of about 0.6 millimeters to about 1.2 millimeters.

7. The cementitious member of claim 1 wherein the structural synthetic fibers have a diameter of about 0.8 millimeters to about 1.0 millimeters.

8. The cementitious member of claim 1 wherein the structural synthetic fibers have a length of about 15 millimeters to about 75 millimeters.

9. The cementitious member of claim 1 wherein the structural synthetic fibers have a modulus of about 3,000 N/mm² to about 4,000 N/mm².

10. The cementitious member of claim 1 wherein the structural synthetic fibers have a modulus of about 3,250 N/mm² to about 3,750 N/mm².

11. The cementitious member of claim 1 wherein the polycarboxylate dispersant is at least one of formulas a) through j):

a) a dispersant of Formula (I):

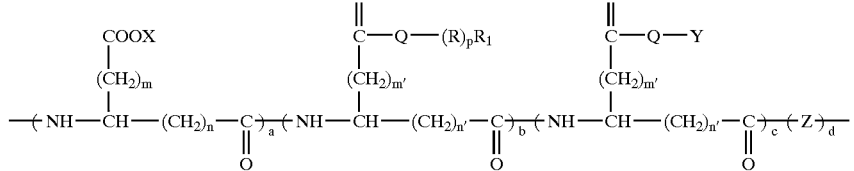

wherein in Formula (I)
X is at least one of hydrogen, an alkali earth metal ion, an alkaline earth metal ion, ammonium ion, or amine;
R is at least one of $C_1$ to $C_6$ alkyl(ene) ether or mixtures thereof or $C_1$ to $C_6$ alkyl(ene) imine or mixtures thereof;
Q is at least one of oxygen, NH, or sulfur;
p is a number from 1 to about 300 resulting in at least one of a linear side chain or branched side chain;
$R_1$ is at least one of hydrogen, $C_1$ to $C_{20}$ hydrocarbon, or functionalized hydrocarbon containing at least one of —OH, —COOH, an ester or amide derivative of —COOH, sulfonic acid, an ester or amide derivative of sulfonic acid, amine, or epoxy;
Y is at least one of hydrogen, an alkali earth metal ion, an alkaline earth metal ion, ammonium ion, amine, a hydrophobic hydrocarbon or polyalkylene oxide moiety that functions as a defoamer;
m, m', m", n, n', and n" are each independently 0 or an integer between 1 and about 20;
Z is a moiety containing at least one of i) at least one amine and one acid group, ii) two functional groups capable of incorporating into the backbone selected from the group consisting of dianhydrides, dialdehydes, and di-acid-chlorides, or iii) an imide residue; and
wherein a, b, c, and d reflect the mole fraction of each unit wherein the sum of a, b, c, and d equal one, wherein a, b, c, and d are each a value greater than or equal to zero and less than one, and at least two of a, b, c, and d are greater than zero;

b) a dispersant of Formula (II):

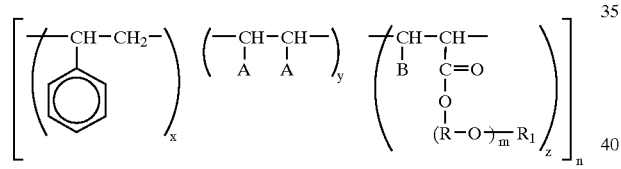

wherein in Formula (II):
A is COOM or optionally in the "y" structure an acid anhydride group (—CO—O—CO—) is formed in place of the A groups between the carbon atoms to which the A groups are bonded to form an anhydride;
B is COOM
M is hydrogen, a transition metal cation, the residue of a hydrophobic polyalkylene glycol or polysiloxane, an alkali metal ion, an alkaline earth metal ion, ferrous ion, aluminum ion, (alkanol)ammonium ion, or (alkyl)ammonium ion;
R is a $C_{2-6}$ alkylene radical;
R1 is a $C_{1-20}$ alkyl, $C_{6-9}$ cycloalkyl, or phenyl group;
x, y, and z are a number from 0.01 to 100;
m is a number from 1 to 100; and
n is a number from 10 to 100;

c) a dispersant comprising at least one polymer or a salt thereof having the form of a copolymer of
i) a maleic anhydride half-ester with a compound of the formula $RO(AO)_mH$, wherein R is a $C_1$–$C_{20}$ alkyl group, A is a $C_{2-4}$ alkylene group, and m is an integer from 2–16; and
ii) a monomer having the formula $CH_2=CHCH_2—(OA)_nOR$, wherein n is an integer from 1–90 and R is a $C_{1-20}$ alkyl group;

d) a dispersant obtained by copolymerizing 5 to 98% by weight of an (alkoxy)polyalkylene glycol mono(meth) acrylic ester monomer (a) represented by the following general formula (1):

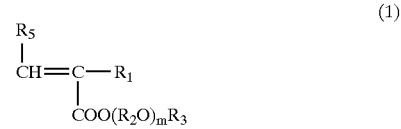

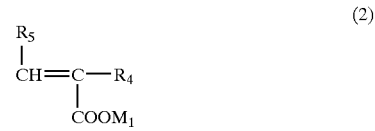

wherein $R_1$ stands for hydrogen atom or a methyl group, $R_2O$ for one species or a mixture of two or more species of oxyalkylene group of 2 to 4 carbon atoms, providing two or more species of the mixture may be added either in the form of a block or in a random form, $R_3$ for a hydrogen atom or an alkyl group of 1 to 5 carbon atoms, and m is a value indicating the average addition mol number of oxyalkylene groups that is an integer in the range of 1 to 100, 95 to 2% by weight of a (meth)acrylic acid monomer (b) represented by the above general formula (2), wherein $R_4$ and $R_5$ are each independently a hydrogen atom or a methyl group, and $M_1$ for a hydrogen atom, a monovalent metal atom, a divalent metal atom, an ammonium group, or an organic amine group, and 0 to 50% by weight of other monomer (c) copolymerizable with these monomers, provided that the total amount of (a), (b), and (c) is 100% by weight;

e) a graft polymer that is a polycarboxylic acid or a salt thereof, having side chains derived from at least one species selected from the group consisting of oligoalkyleneglycols, polyalcohols, polyoxyalkylene amines, and polyalkylene glycols;

f) a dispersant of Formula (III):

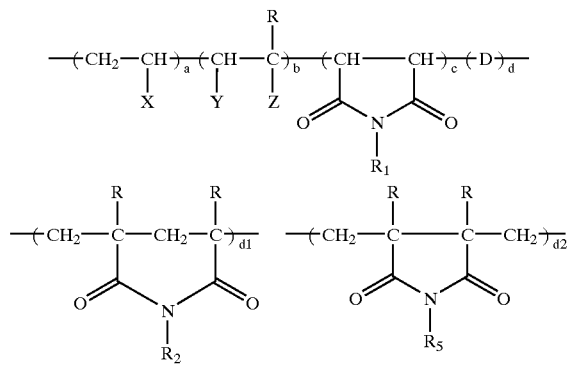

wherein in Formula (III):
D=a component selected from the group consisting of the structure d1, the structure d2, and mixtures thereof;
X=H, $CH_3$, $C_2$ to $C_6$ Alkyl, Phenyl, p-Methyl Phenyl, or Sulfonated Phenyl;
Y=H or —COOM;
R=H or $CH_3$;
Z=H, —$SO_3M$, —$PO_3M$, —COOM, —$O(CH_2)_nOR_3$ where n=2 to 6, —$COOR_3$, or —$(CH_2)_nOR_3$ where n=0 to 6, —CONHR$_3$, —CONHC(CH$_3$)$_2$ CH$_2$SO$_3$M, —COO(CHR$_4$)$_n$OH where n=2 to 6, or —O(CH$_2$)$_n$OR$_4$ wherein n=2 to 6;

R$_1$, R$_2$, R$_3$, R$_5$ are each independently —(CHRCH$_2$O)$_m$R$_4$ random copolymer of oxyethylene units and oxypropylene units where m=10 to 500 and wherein the amount of oxyethylene in the random copolymer is from about 60% to 100% and the amount of oxypropylene in the random copolymer is from 0% to about 40%;

R$_4$=H, Methyl, C$_2$ to about C$_6$ Alkyl, or about C$_6$ to about C$_{10}$ aryl;

M=H, Alkali Metal, Alkaline Earth Metal, Ammonium, Amine, triethanol amine, Methyl, or C$_2$ to about C$_6$ Alkyl;

a=0 to about 0.8;
b=about 0.2 to about 1.0;
c=0 to about 0.5;
d=0 to about 0.5; and
wherein a, b, c, and d represent the mole fraction of each unit and the sum of a, b, c, and d is 1.0;

g) a dispersant of Formula (IV):

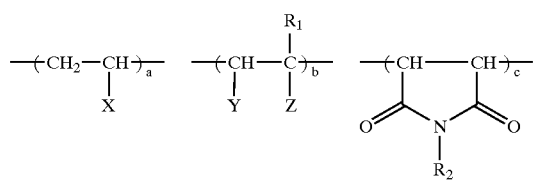

wherein in Formula (IV):
the "b" structure is one of a carboxylic acid monomer, an ethylenically unsaturated monomer, or maleic anhydride wherein an acid anhydride group (—CO—O—CO—) is formed in place of the groups Y and Z between the carbon atoms to which the groups Y and Z are bonded respectively, and the "b" structure must include at least one moiety with a pendant ester linkage and at least one moiety with a pendant amide linkage;

X=H, CH$_3$, C$_2$ to C$_6$ Alkyl, Phenyl, p-Methyl Phenyl, p-Ethyl Phenyl, Carboxylated Phenyl, or Sulfonated Phenyl;

Y=H, —COOM, —COOH, or W;

W=a hydrophobic defoamer represented by the formula R$_5$O—(CH$_2$CH$_2$O)$_s$—(CH$_2$C(CH$_3$)HO)$_t$—(CH$_2$CH$_2$O)$_u$ where s, t, and u are integers from 0 to 200 with the proviso that t>(s+u) and wherein the total amount of hydrophobic defoamer is present in an amount less than about 10% by weight of the polycarboxylate dispersant;

Z=H, —COOM, —O(CH$_2$)$_n$OR$_3$ where n=2 to 6, —COOR$_3$, —(CH$_2$)$_n$OR$_3$ where n=0 to 6, or —CONHR$_3$;

R$_1$=H, or CH$_3$;

R$_2$, R$_3$, are each independently a random copolymer of oxyethylene units and oxypropylene units of the general formula —(CH(R$_1$)CH$_2$O)$_m$R$_4$ where m=10 to 500 and wherein the amount of oxyethylene in the random copolymer is from about 60% to 100% and the amount of oxypropylene in the random copolymer is from 0% to about 40%;

R$_4$=H, Methyl, or C$_2$ to C$_8$ Alkyl;

R$_5$=C$_1$ to C$_{18}$ alkyl or C$_6$ to C$_{18}$ alkyl aryl;

M=Alkali Metal, Alkaline Earth Metal, Ammonia, Amine, monoethanol amine, diethanol amine, triethanol amine, morpholine, imidazole;

a=0.01–0.8;
b=0.2–0.99;
c=0–0.5; and wherein a, b, c represent the mole fraction of each unit and the sum of a, b, and c, is 1;

h) a random copolymer corresponding to the following Formula (V) in free acid or salt form having the following monomer units and numbers of monomer units:

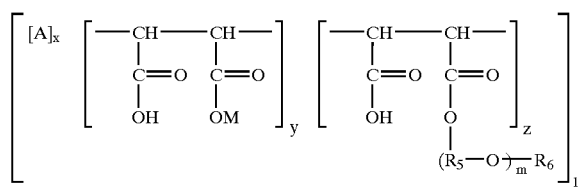

wherein A is selected from the moieties (i) or (ii)
(i) —CR$_1$R$_2$—CR$_3$R$_4$—

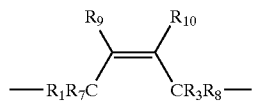

wherein R$_1$ and R$_3$ are selected from substituted benzene, C$_{1-8}$ alkyl, C$_{2-8}$ alkenyl, C$_{2-8}$ alkylcarbonyl, C$_{1-8}$ alkoxy, carboxyl, hydrogen, and a ring, R$_2$ and R$_4$ are selected from the group consisting of hydrogen and C$_{1-4}$ alkyl, wherein R$_1$ and R$_3$ can together with R$_2$ and/or R$_4$ when R$_2$ and/or R$_4$ are C$_{1-4}$ alkyl form the ring;

R$_7$, R$_8$, R$_9$, and R$_{10}$ are individually selected from the group consisting of hydrogen, C$_{1-6}$ alkyl, and a C$_{2-8}$ hydrocarbon chain, wherein R$_1$ and R$_3$ together with R$_7$ and/or R$_8$, R$_9$, and R$_{10}$ form the C$_{2-8}$ hydrocarbon chain joining the carbon atoms to which they are attached, the hydrocarbon chain optionally having at least one anionic group, wherein the at least one anionic group is optionally sulfonic;

M is selected from the group consisting of hydrogen, and the residue of a hydrophobic polyalkylene glycol or a polysiloxane, with the proviso that when A is (ii) and M is the residue of a hydrophobic polyalkylene glycol, M must be different from the group —(R$_5$O)$_m$R$_6$;

R$_5$ is a C$_{2-8}$ alkylene radical;
R$_6$ is selected from the group consisting of C$_{1-20}$ alkyl, C$_{6-9}$ cycloalkyl and phenyl;
n, x, and z are numbers from 1 to 100;
y is 0 to 100;
m is 2 to 1000;
the ratio of x to (y+z) is from 1:10 to 10:1 and the ratio of y:z is from 5:1 to 1:100;

i) a copolymer of oxyalkyleneglycol-alkenyl ethers and unsaturated dicarboxylic acids, comprising:
i) 0 to 90 mol % of at least one component of the formula 3a or 3b:

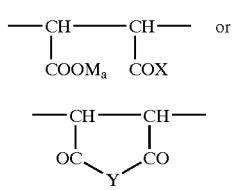
(3a)

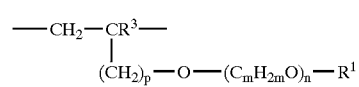
(3b)

wherein M is a hydrogen atom, a mono- or divalent metal cation, an ammonium ion or an organic amine residue, a is 1, or when M is a divalent metal cation a is ½;

wherein X is —$OM_a$,
—O—$(C_mH_{2m}O)_n$—$R^1$ in which $R^1$ is a hydrogen atom, an aliphatic hydrocarbon radical containing from 1 to 20 carbon atoms, a cycloaliphatic hydrocarbon radical containing 5 to 8 carbon atoms or an optionally hydroxyl, carboxyl, $C_{1-14}$ alkyl, or sulphonic substituted aryl radical containing 6 to 14 carbon atoms, m is 2 to 4, and n is 0 to 100, —$NHR_2$, —$N(R^2)_2$ or mixtures thereof in which $R^2=R^1$ or —CO—$NH_2$; and wherein Y is an oxygen atom or —$NR^2$;

ii) 1 to 89 mol % of components of the general formula 4:

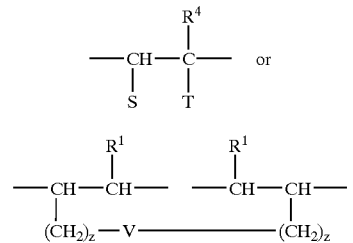
(4)

wherein $R_3$ is a hydrogen atom or an aliphatic hydrocarbon radical containing from 1 to 5 carbon atoms, p is 0 to 3, and $R_1$ is hydrogen, an aliphatic hydrocarbon radical containing from 1 to 20 carbon atoms, a cycloaliphatic hydrocarbon radical containing 5 to 8 carbon atoms or an optionally hydroxyl, carboxyl, $C_{1-14}$ alkyl, or sulfonic substituted aryl radical containing 6 to 14 carbon atoms, m is 2 to 4, and n is 0 to 100, and iii) 0.1 to 10 mol % of at least one component of the formula 5a or 5b:

(5a)

(5b)

wherein S is a hydrogen atom or —$COOM_a$ or —$COOR_5$, T is —$COOR_5$, —W—$R_7$, —CO—[—NH—(CH2)3)-$]_s$—W—$R_7$, —CO—O—$(CH_2)_z$—W—$R_7$, a radical of the general formula:

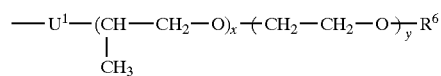

or —$(CH_2)_z$—V—$(CH_2)_z$—CH=CH—$R_1$, or when S is —$COOR_5$ or —$COOM_a$, $U_1$ is —CO—NHM-, —O— or —$CH_2O$, $U_2$ is —NH—CO—, —O— or —$OCH_2$, V is —O—CO—$C_6H_4$—CO—O— or —W—, and W is

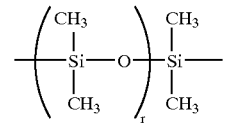

R4 is a hydrogen atom or a methyl radical, R5 is an aliphatic hydrocarbon radical containing 3 to 20 carbon atoms, a cycloaliphatic hydrocarbon radical containing 5 to 8 carbon atoms or an aryl radical containing 6 to 14 carbon atoms, $R_6=R_1$ or

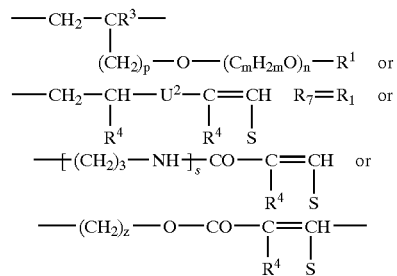

r is 2 to 100, s is 1 or 2, x is 1 to 150, y is 0 to 15 and z is 0 to 4;

iv) 0 to 90 mol % of at least one component of the formula 6a, 6b, or 6c:

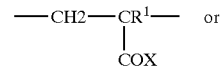
(6a)

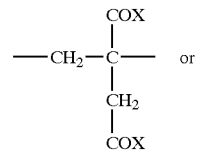
(6b)

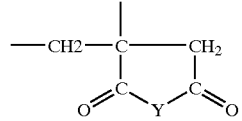
(6c)

wherein M is a hydrogen atom, a mono- or divalent metal cation, an ammonium ion or an organic amine residue, a is 1, or when M is a divalent metal cation a is ½;

wherein X is —$OM_a$,
—O—$(C_mH_{2m}O)_n$—$R^1$ in which $R^1$ is a hydrogen atom, an aliphatic hydrocarbon radical containing from 1 to 20 carbon atoms, a cycloaliphatic hydrocarbon radical containing 5 to 8 carbon atoms or an optionally hydroxyl, carboxyl, $C_{1-14}$ alkyl, or sulphonic substituted aryl radical containing 6 to 14 carbon atoms, m is 2 to 4, and n is 0 to 100, —NH—$(C_mH_{2m}O)_n$—$R^1$, —$NHR_2$, —$N(R^2)_2$ or mixtures thereof in which $R^2=R^1$ or —CO—$NH_2$; and wherein Y is an oxygen atom or —$NR^2$;

j) a copolymer of dicarboxylic acid derivatives and oxyalkylene glycol-alkenyl ethers, comprising:

i) 1 to 90 mol. % of at least one member selected from the group consisting of structural units of formula 7a and formula 7b:

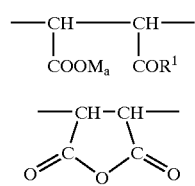

wherein M is H, a monovalent metal cation, a divalent metal cation, an ammonium ion or an organic amine;
a is ½ when M is a divalent metal cation or 1 when M is a monovalent metal cation;
wherein $R^1$ is —$OM_a$, or
—O—$(C_mH_{2m}O)_n$—$R^2$ wherein $R^2$ is H, a $C_{1-20}$ aliphatic hydrocarbon, a $C_{5-8}$ cycloaliphatic hydrocarbon, or a $C_{6-14}$ aryl that is optionally substituted with at least one member selected from the group consisting of [—$COOM_a$, —$(SO_3)M_a$, and —$(PO_3)M_{a2}$];
m is 2 to 4;
n is 1 to 200;
ii) 0.5 to 80 mol. % of the structural units of formula 8:

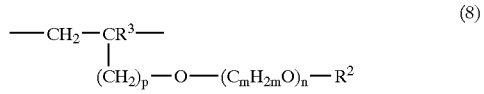

wherein $R^3$ is H or a $C_{1-5}$ aliphatic hydrocarbon;
p is 0 to 3;
$R^2$ is H, a $C_{1-20}$ aliphatic hydrocarbon, a $C_{5-8}$ cycloaliphatic hydrocarbon, or a $C_{6-14}$ aryl that is optionally substituted with at least one member selected from the group consisting of [—$COOM_a$, —$(SO_3)M_a$, and —$(PO_3)M_{a2}$];
m is 2 to 4;
n is 1 to 200;
iii) 0.5 to 80 mol. % structural units selected from the group consisting of formula 9a and formula 9b:

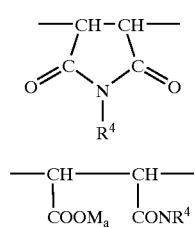

wherein $R^4$ is H, $C_{1-20}$ aliphatic hydrocarbon that is optionally substituted with at least one hydroxyl group, —$(C_mH_{2m}O)_n$—$R^2$, —CO—NH—$R^2$, $C_{5-8}$ cycloaliphatic hydrocarbon, or a $C_{6-14}$ aryl that is optionally substituted with at least one member selected from the group consisting of [—$COOM_a$, —$(SO_3)M_a$, and —$(PO_3)M_{a2}$];
M is H, a monovalent metal cation, a divalent metal cation, an ammonium ion or an organic amine;
a is ½ when M is a divalent metal cation or 1 when M is a monovalent metal cation;
$R^2$ is H, a $C_{1-20}$ aliphatic hydrocarbon, a $C_{5-8}$ cycloaliphatic hydrocarbon, or a $C_{6-14}$ aryl that is optionally substituted with at least one member selected from the group consisting of [—$COOM_a$, —$(SO_3)M_a$, and —$(PO_3)M_{a2}$];
m is 2 to 4;
n is 1 to 200;
iv) 1 to 90 mol. % of structural units of formula 10

wherein $R^5$ is methyl, or methylene group, wherein $R^5$ forms one or more 5 to 8 membered rings with $R^7$;
$R^6$ is H, methyl, or ethyl;
$R^7$ is H, a $C_{1-20}$ aliphatic hydrocarbon, a $C_{6-14}$ aryl that is optionally substituted with at least one member selected from the group consisting of [—$COOM_a$, —$(SO_3)M_a$, and —$(PO_3)M_{a2}$], a $C_{5-8}$ cycloaliphatic hydrocarbon, —$OCOR^4$, —$OR^4$, or —$COOR^4$, wherein $R^4$ is H, a $C_{1-20}$ aliphatic hydrocarbon that is optionally substituted with at least one —OH, —$(C_mH_{2m}O)_n$—$R^2$, —CO—NH—$R^2$, $C_{5-8}$ cycloaliphatic hydrocarbon, or a $C_{6-14}$ aryl residue that is optionally substituted with a member selected from the group consisting of [—$COOM_a$, —$(SO_3)M_a$, —$(PO_3)M_{a2}$].

12. The cementitious member of claim 11 wherein the member is prepared by mixing water and hydraulic cement, polycarboxylate dispersant, and structural synthetic fibers, wherein the water to cement ratio is about 0.2 to about 0.35.

13. The cementitious member of claim 11 wherein the cementitious materials content is about 800 lb/yd³ to about 1,600 lb/yd³.

14. The cementitious member of claim 11 wherein the structural synthetic fibers are at least one of structural plastic fibers, carbon, glass, or mixtures thereof.

15. The cementitious member of claim 14 wherein the structural plastic fibers are at least one of polyethylene, polyester, rayon, or mixtures thereof.

16. The cementitious member of claim 11 wherein the structural synthetic fibers have a diameter of about 0.6 millimeters to about 1.2 millimeters.

17. The cementitious member of claim 11 wherein the structural synthetic fibers have a diameter of about 0.8 millimeters to about 1.0 millimeters.

18. The cementitious member of claim 11 wherein the structural synthetic fibers have a length of about 15 millimeters to about 75 millimeters.

19. The cementitious member of claim 11 wherein the structural synthetic fibers have a modulus of about 3,000 N/mm² to about 4,000 N/mm².

20. The cementitious member of claim 11 wherein the structural synthetic fibers have a modulus of about 3,250 N/mm² to about 3,750 N/mm².

21. The cementitious member of claim 1 or 11, wherein the polycarboxylate high range water reducing dispersant has a solids content of about 20% to about 30% and is present in an amount from about 5 to about 35 oz/cwt.

22. The cementitious member of claim 1 or 11, wherein the primary active ingredient of the polycarboxylate high range water reducing dispersant is about 0.025% to about 0.7% based on the dry weight of cement.

23. The cementitious member of claim 1 or 11 wherein the structural synthetic fiber loadings are about 1% to about 10% by volume of the composition.

24. The cementitious member of claim 1 or 11 wherein a set accelerator is present.

25. The cementitious member of claim 24 wherein the set accelerator comprises at least one of:
   a) a nitric acid salt of an alkali metal, alkaline earth metal, or aluminum;
   b) a nitrite salt of an alkali metal, alkaline earth metal, or aluminum;
   c) a thiocyanic acid salt of an alkali metal, alkaline earth metal or aluminum;
   d) an alkanolamine;
   e) a thiosulfate of an alkali metal, alkaline earth metal, or aluminum;
   f) a carboxylic acid salt of an alkali metal, alkaline earth metal, or aluminum; or
   g) a polyhydroxylalkylamine.

26. The cementitious member of claim 1 or 11 wherein a set retarder is present.

27. The cementitious member of claim 26 wherein the set retarder is at least one of an oxy-boron compound, lignin, a polyphosphonic acid, a carboxylic acid, a hydroxycarboxylic acid, polycarboxylic acid, hydroxylated carboxylic acid, fumaric, itaconic, malonic, borax, gluconic, and tartaric acid, lignosulfonates, ascorbic acid, isoascorbic acid, sulphonic acid-acrylic acid copolymer, and their corresponding salts, polyhydroxysilane, polyacrylamide, carbohydrates or mixtures thereof.

28. The cementitious member of claim 1 or 11 wherein the hydraulic cement is at least one of portland cement, modified portland cement, masonry cement, or mixtures thereof.

29. The cementitious member of claim 1 or 11 further including pozzolan that is at least one of diatomaceous earth, opaline cherts, clays, shales, fly ash, silica fume, volcanic tuffs and pumicites, metakaolin, granulated blast furnace slag, fly ash, or mixtures thereof.

30. The cementitious member of claim 1 or 11 further comprising a cement admixture or additive that is at least one of air detraining agents, water reducers, wetting agents, water soluble polymers, strength enhancing agents, rheology modifying agents, water repellents, dampproofing admixtures, gas formers, permeability reducers, pumping aids, fungicidal admixtures, germicidal admixtures, insecticidal admixtures, finely divided mineral admixtures, alkali-reactivity reducer, bonding admixtures, shrinkage compensation agents, defoamers or aggregate.

31. The cementitious member of claim 30 wherein the shrinkage compensation agent is at least one of $RO(AO)_{1-10}H$, wherein R is a $C_{1-5}$ alkyl or $C_{5-6}$ cycloalkyl radical and A is a $C_{2-3}$ alkylene radical, alkali metal sulfates, alkaline earth metal sulfates, or alkaline earth oxides.

32. The cementitious member of claim 31 wherein the alkaline earth oxides are at least one of sodium sulfate or calcium oxide.

33. The cementitious member of claim 30 wherein the defoamer is at least one of silicones or petroleum oil mixtures.

34. The cementitious member of claim 1 or 11 wherein the member is at least one of wall panels, beams or columns.

35. A method of making a high early-strength reinforced pre-cast or cast in place member comprising:
   a. preparing a high early-strength reinforced cementitious composition by mixing water and strength generating ingredients comprising hydraulic cement, polycarboxylate dispersant, and structural synthetic fibers; and
   b. forming a cementitious member without metal bar, metal fiber or metal rod reinforcement from the high early-strength reinforced cementitious composition wherein the cementitious member develops a high early-strength of at least about 1,400 pounds per square inch (psi) flexural strength and at least about 7,500 pounds per square inch (psi) compressive strength within about 24 hours after placing the cementitious composition in a mold.

36. The method of claim 35, wherein said forming is one of i) placing said unset high early-strength reinforced cementitious composition in a mold and vibrating said mold, ii) allowing the high early-strength reinforced cementitious composition to cure or set into an article, and iii) stripping the cured or set article from said mold.

37. The method of claim 35 wherein a set accelerator is present.

38. The method of claim 37, wherein the set accelerator comprises at least one of:
   a) a nitrate salt of an alkali metal, alkaline earth metal, or aluminum;
   b) a nitrite salt of an alkali metal, alkaline earth metal, or aluminum;
   c) a thiocyanate of an alkali metal, alkaline earth metal or aluminum;
   d) an alkanolamine;
   e) a thiosulfate of an alkali metal, alkaline earth metal, or aluminum;
   f) a carboxylic acid salt of an alkali metal, alkaline earth metal, or aluminum; or
   g) a polyhydroxylalkylamine.

39. The method of claim 35 wherein a set retarder is present.

40. The method of claim 39 wherein the set retarder is at least one of an oxy-boron compound, lignin, a polyphosphonic acid, a carboxylic acid, a hydroxycarboxylic acid, polycarboxylic acid, hydroxylated carboxylic acid, fumaric, itaconic, malonic, borax, gluconic, and tartaric acid, lignosulfonates, ascorbic acid, isoascorbic acid, sulphonic acid-acrylic acid copolymer, and their corresponding salts, polyhydroxysilane, polyacrylamide, carbohydrates or mixtures thereof.

41. The method of claim 35 wherein the hydraulic cement is at least one of portland cement, modified portland cement, masonry cement, or mixtures thereof.

42. The method of claim 35 further including pozzolan that is at least one of diatomaceous earth, opaline cherts, clays, shales, fly ash, silica fume, volcanic tuffs and pumicites, metakaolin, granulated blast furnace slag, fly ash, or mixtures thereof.

43. The method of claim 35 further comprising a cement admixture or additive that is at least one of air detraining agents, water reducers, wetting agents, water soluble polymers, strength enhancing agents, rheology modifying agents, water repellents, dampproofing admixtures, gas formers, permeability reducers, pumping aids, fungicidal admixtures, germicidal admixtures, insecticidal admixtures, finely divided mineral admixtures, alkali-reactivity reducer, bonding admixtures, shrinkage compensation agents, defoamers or aggregate.

44. The method of claim 43 wherein the shrinkage compensation agent is at least one of $RO(AO)_{1-10}H$, wherein R is a $C_{1-5}$ alkyl or $C_{5-6}$ cycloalkyl radical and A is a $C_{2-3}$ alkylene radical, alkali metal sulfates, alkaline earth metal sulfates, or alkaline earth oxides.

45. The method of claim 44 wherein the alkaline earth oxides are at least one of sodium sulfate or calcium oxide.

46. The method of claim 43 wherein the defoamer is at least one of silicones or petroleum oil mixtures.

47. The method of claim 35 wherein the water to cement ratio is about 0.2 to about 0.35.

48. The method of claim 35 wherein the cementitious materials content of the cementitious member is about 800 lb/yd³ to about 1,600 lb/yd³.

49. The method of claim 35 wherein the structural synthetic fibers are at least one of structural plastic fibers, carbon or mixtures thereof.

50. The method of claim 49 wherein the structural plastic fibers are at least one of nylon, polyethylene, polyester, rayon, or mixtures thereof.

51. The method of claim 35 wherein the structural synthetic fibers have a diameter of about 0.6 millimeters to about 1.2 millimeters.

52. The method of claim 35 wherein the structural synthetic fibers have a diameter of about 0.8 millimeters to about 1.0 millimeters.

53. The method of claim 35 wherein the structural synthetic fibers have a length of about 15 millimeters to about 75 millimeters.

54. The method of claim 35 wherein the structural synthetic fibers have a modulus of about 3,000 N/mm² to about 4,000 N/mm².

55. The method of claim 35 wherein the structural synthetic fibers have a modulus of about 3,250 N/mm² to about 3,750 N/mm².

56. The method of claim 35 wherein the polycarboxylate high range water reducing dispersant has a solids content of about 20% to about 30% and is present in an amount from about 5 to about 35 oz/cwt.

57. The method of claim 35 wherein the primary active ingredient of the polycarboxylate high range water reducing dispersant is about 0.025% to about 0.7% based on dry weight of cement.

58. The method of claim 35 wherein the structural synthetic fiber loadings are about 1% to about 10% by volume of the composition.

59. The method of claim 35 wherein the member is at least one of wall panels, beams or columns.

60. The method of claim 35, wherein the polycarboxylate dispersant is at least one of formulas a) through j):

a) a dispersant of Formula (I):

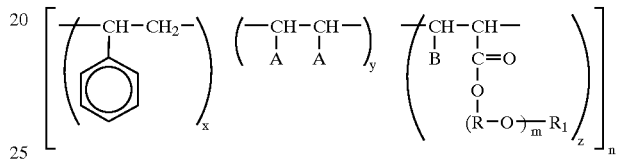

wherein in Formula (I)
X is at least one of hydrogen, an alkali earth metal ion, an alkaline earth metal ion, ammonium ion, or amine;
R is at least one of $C_1$ to $C_6$ alkyl(ene) ether or mixtures thereof or $C_1$ to $C_6$ alkyl(ene) imine or mixtures thereof;
Q is at least one of oxygen, NH, or sulfur;
p is a number from 1 to about 300 resulting in at least one of a linear side chain or branched side chain;
$R^1$ is at least one of hydrogen, $C_1$ to $C_{20}$ hydrocarbon, or functionalized hydrocarbon containing at least one of —OH, —COOH, an ester or amide derivative of —COOH, sulfonic acid, an ester or amide derivative of sulfonic acid, amine, or epoxy;

Y is at least one of hydrogen, an alkali earth metal ion, an alkaline earth metal ion, ammonium ion, amine, a hydrophobic hydrocarbon or polyalkylene oxide moiety that functions as a defoamer;
m, m', m", n, n', and n" are each independently 0 or an integer between 1 and about 20;
Z is a moiety containing at least one of i) at least one amine and one acid group, ii) two functional groups capable of incorporating into the backbone selected from the group consisting of dianhydrides, dialdehydes, and di-acid-chlorides, or iii) an imide residue; and
wherein a, b, c, and d reflect the mole fraction of each unit wherein the sum of a, b, c, and d equal one, wherein a, b, c, and d are each a value greater than or equal to zero and less than one, and at least two of a, b, c, and d are greater than zero;

b) a dispersant of Formula (II):

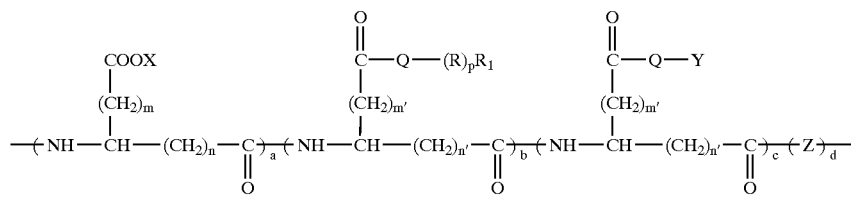

wherein in Formula (II):
A is COOM or optionally in the "y" structure an acid anhydride group (—CO—O—CO—) is formed in place of the A groups between the carbon atoms to which the A groups are bonded to form an anhydride;
B is COOM
M is hydrogen, a transition metal cation, the residue of a hydrophobic polyalkylene glycol or polysiloxane, an alkali metal ion, an alkaline earth metal ion, ferrous ion, aluminum ion, (alkanol)ammonium ion, or (alkyl)ammonium ion;
R is a $C_{2-6}$ alkylene radical;
R1 is a $C_{1-20}$ alkyl, $C_{6-9}$ cycloalkyl, or phenyl group;
x, y, and z are a number from 0.01 to 100;
m is a number from 1 to 100; and
n is a number from 10 to 100;

c) a dispersant comprising at least one polymer or a salt thereof having the form of a copolymer of
i) a maleic anhydride half-ester with a compound of the formula $RO(AO)_mH$, wherein R is a $C_1$–$C_{20}$ alkyl group, A is a $C_{2-4}$ alkylene group, and m is an integer from 2–16; and
ii) a monomer having the formula $CH_2=CHCH_2$—$(OA)_nOR$, wherein n is an integer from 1–90 and R is a $C_{1-20}$ alkyl group;

d) a dispersant obtained by copolymerizing 5 to 98% by weight of an (alkoxy)polyalkylene glycol mono(meth) acrylic ester monomer (a) represented by the following general formula (1):

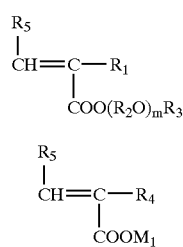

(1)

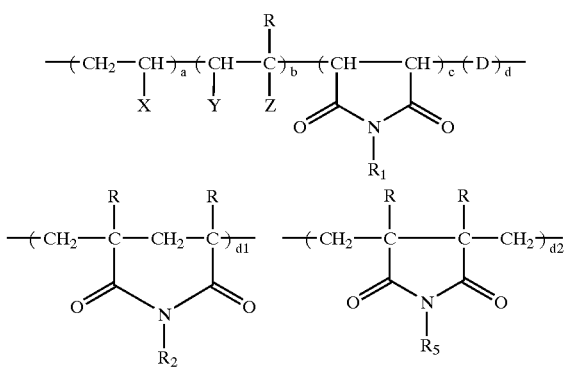

(2)

wherein R₁ stands for hydrogen atom or a methyl group, R₂O for one species or a mixture of two or more species of oxyalkylene group of 2 to 4 carbon atoms, providing two or more species of the mixture may be added either in the form of a block or in a random form, R₃ for a hydrogen atom or an alkyl group of 1 to 5 carbon atoms, and m is a value indicating the average addition mol number of oxyalkylene groups that is an integer in the range of 1 to 100, 95 to 2% by weight of a (meth)acrylic acid monomer (b) represented by the above general formula (2), wherein R₄ and R₅ are each independently a hydrogen atom or a methyl group, and M₁ for a hydrogen atom, a monovalent metal atom, a divalent metal atom, an ammonium group, or an organic amine group, and 0 to 50% by weight of other monomer (c) copolymerizable with these monomers, provided that the total amount of (a), (b), and (c) is 100% by weight;

e) a graft polymer that is a polycarboxylic acid or a salt thereof, having side chains derived from at least one species selected from the group consisting of oligoalkyleneglycols, polyalcohols, polyoxyalkylene amines, and polyalkylene glycols;

f) a dispersant of Formula (III):

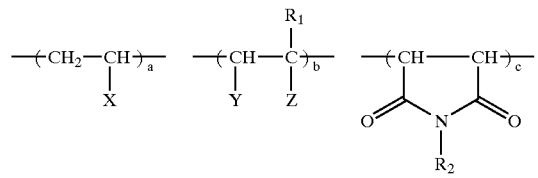

wherein in Formula (III):

D=a component selected from the group consisting of the structure d1, the structure d2, and mixtures thereof;

X=H, CH₃, C₂ to C₆ Alkyl, Phenyl, p-Methyl Phenyl, or Sulfonated Phenyl;

Y=H or —COOM;

R=H or CH₃;

Z=H, —SO₃M, —PO₃M, —COOM, —O(CH₂)$_n$OR₃ where n=2 to 6, —COOR₃, or —(CH₂)$_n$OR₃ where n=0 to 6, —CONHR₃, —CONHC(CH₃)₂CH₂SO₃M, —COO(CHR₄)$_n$OH where n=2 to 6, or —O(CH₂)$_n$OR₄ wherein n=2 to 6;

R₁, R₂, R₃, R₅ are each independently —(CHRCH₂O)$_m$R₄ random copolymer of oxyethylene units and oxypropylene units where m=10 to 500 and wherein the amount of oxyethylene in the random copolymer is from about 60% to 100% and the amount of oxypropylene in the random copolymer is from 0% to about 40%;

R₄=H, Methyl, C₂ to about C₆ Alkyl, or about C₆ to about C₁₀ aryl;

M=H, Alkali Metal, Alkaline Earth Metal, Ammonium, Amine, triethanol amine, Methyl, or C₂ to about C₆ Alkyl;

a 0 to about 0.8;

b=about 0.2 to about 1.0;

c=0 to about 0.5;

d=0 to about 0.5; and wherein a, b, c, and d represent the mole fraction of each unit and the sum of a, b, c, and d is 1.0;

g) a dispersant of Formula (IV):

$$-(CH_2-CH)_a- \quad -(CH-\underset{Z}{\overset{R_1}{\underset{|}{C}}})_b- \quad -(CH-CH)_c-$$

wherein in Formula (IV):

the "b" structure is one of a carboxylic acid monomer, an ethylenically unsaturated monomer, or maleic anhydride wherein an acid anhydride group (—CO—O—CO—) is formed in place of the groups Y and Z between the carbon atoms to which the groups Y and Z are bonded respectively, and the "b" structure must include at least one moiety with a pendant ester linkage and at least one moiety with a pendant amide linkage;

X=H, CH₃, C₂ to C₆ Alkyl, Phenyl, p-Methyl Phenyl, p-Ethyl Phenyl, Carboxylated Phenyl, or Sulfonated Phenyl;

Y=H, —COOM, —COOH, or W;

W=a hydrophobic defoamer represented by the formula R₅O—(CH₂CH₂O)$_s$—(CH₂C(CH₃)HO)$_t$—(CH₂CH₂O)$_u$ where s, t, and u are integers from 0 to 200 with the proviso that t>(s+u) and wherein the total amount of hydrophobic defoamer is present in an amount less than about 10% by weight of the polycarboxylate dispersant;

Z=H, —COOM, —O(CH₂)$_n$OR₃ where n=2 to 6, —COOR₃, —(CH₂)$_n$OR₃ where n=0 to 6, or —CONHR₃;

R₁=H, or CH₃;

R₂, R₃, are each independently a random copolymer of oxyethylene units and oxypropylene units of the general formula —(CH(R₁)CH₂O)$_m$R₄ where m=10 to 500 and wherein the amount of oxyethylene in the random copolymer is from about 60% to 100% and the amount of oxypropylene in the random copolymer is from 0% to about 40%;

R₄=H, Methyl, or C₂ to C₈ Alkyl;

R₅=C₁ to C₁₈ alkyl or C₆ to C₁₈ alkyl aryl;

M=Alkali Metal, Alkaline Earth Metal, Ammonia, Amine, monoethanol amine, diethanol amine, triethanol amine, morpholine, imidazole;

a=0.01–0.8;
b=0.2–0.99;
c=0–0.5; and
wherein a, b, c represent the mole fraction of each unit and the sum of a, b, and c, is 1;

h) a random copolymer corresponding to the following Formula (V) in free acid or salt form having the following monomer units and numbers of monomer units:

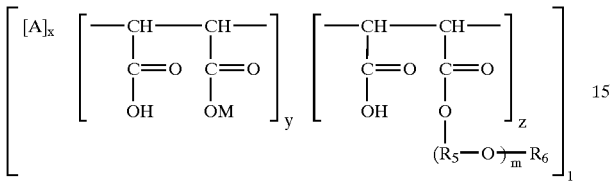

wherein A is selected from the moieties (i) or (ii)
(i) —$CR_1R_2$—$CR_3R_4$—

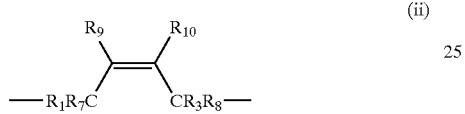

wherein $R_1$ and $R_3$ are selected from substituted benzene, $C_{1-8}$ alkyl, $C_{2-8}$ alkenyl, $C_{2-8}$ alkylcarbonyl, $C_{1-8}$ alkoxy, carboxyl, hydrogen, and a ring, $R_2$ and $R_4$ are selected from the group consisting of hydrogen and $C_{1-4}$ alkyl, wherein $R_1$ and $R_3$ can together with $R_2$ and/or $R_4$ when $R_2$ and/or $R_4$ are $C_{1-4}$ alkyl form the ring;
$R_7$, $R_8$, $R_9$, and $R_{10}$ are individually selected from the group consisting of hydrogen, $C_{1-6}$ alkyl, and a $C_{2-8}$ hydrocarbon chain, wherein $R_1$ and $R_3$ together with $R_7$ and/or $R_8$, $R_9$, and $R_{10}$ form the $C_{2-8}$ hydrocarbon chain joining the carbon atoms to which they are attached, the hydrocarbon chain optionally having at least one anionic group, wherein the at least one anionic group is optionally sulfonic;
M is selected from the group consisting of hydrogen, and the residue of a hydrophobic polyalkylene glycol or a polysiloxane, with the proviso that when A is (ii) and M is the residue of a hydrophobic polyalkylene glycol, M must be different from the group —$(R_5O)_mR_6$;
$R_5$ is a $C_{2-8}$ alkylene radical;
$R_6$ is selected from the group consisting of $C_{1-20}$ alkyl, $C_{6-9}$ cycloalkyl and phenyl;
n, x, and z are numbers from 1 to 100;
y is 0 to 100;
m is 2 to 1000;
the ratio of x to (y+z) is from 1:10 to 10:1 and the ratio of y:z is from 5:1 to 1:100;

i) a copolymer of oxyalkyleneglycol-alkenyl ethers and unsaturated dicarboxylic acids, comprising:
i) 0 to 90 mol % of at least one component of the formula 3a or 3b:

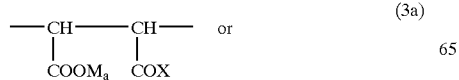

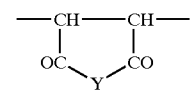

wherein M is a hydrogen atom, a mono- or divalent metal cation, an ammonium ion or an organic amine residue, a is 1, or when M is a divalent metal cation a is ½;
wherein X is —$OM_a$,
—O—$(C_mH_{2m}O)_n$—$R^1$ in which $R^1$ is a hydrogen atom, an aliphatic hydrocarbon radical containing from 1 to 20 carbon atoms, a cycloaliphatic hydrocarbon radical containing 5 to 8 carbon atoms or an optionally hydroxyl, carboxyl, $C_{1-14}$ alkyl, or sulphonic substituted aryl radical containing 6 to 14 carbon atoms, m is 2 to 4, and n is 0 to 100,
—$NHR^2$, —$N(R^2)_2$ or mixtures thereof in which $R^2=R^1$ or —CO—$NH_2$; and
wherein Y is an oxygen atom or —$NR^2$;
ii) 1 to 89 mol % of components of the general formula 4:

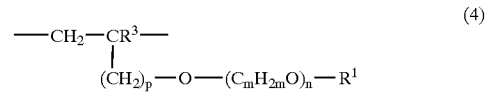

wherein $R_3$ is a hydrogen atom or an aliphatic hydrocarbon radical containing from 1 to 5 carbon atoms, p is 0 to 3, and $R_1$ is hydrogen, an aliphatic hydrocarbon radical containing from 1 to 20 carbon atoms, a cycloaliphatic hydrocarbon radical containing 5 to 8 carbon atoms or an optionally hydroxyl, carboxyl, $C_{1-14}$ alkyl, or sulfonic substituted aryl radical containing 6 to 14 carbon atoms, m is 2 to 4, and n is 0 to 100, and
iii) 0.1 to 10 mol % of at least one component of the formula 5a or 5b:

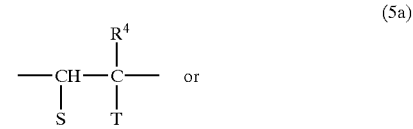

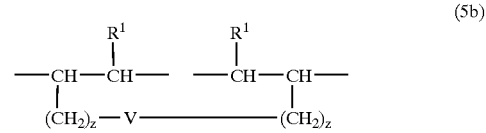

wherein S is a hydrogen atom or —$COOM_a$ or —$COOR_5$, T is —$COOR_5$, —W—$R_7$, —CO—[—NH—(CH2)3)-]$_s$—W—$R_7$, —CO—O—$(CH_2)_z$—W—$R_7$, a radical of the general formula:

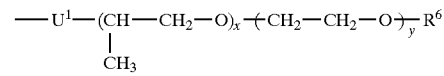

or —$(CH_2)_z$—V—$(CH_2)_z$—CH=CH—$R_1$, or when S is —$COOR_5$ or —$COOM_a$, $U_1$ is —CO—NHM-, —O— or —$CH_2O$, $U_2$ is —NH—CO—, —O— or —$OCH_2$, V is —O—CO—$C_6H_4$—CO—O— or —W—, and W is

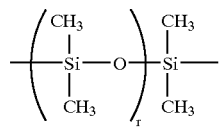

R4 is a hydrogen atom or a methyl radical, R5 is an aliphatic hydrocarbon radical containing 3 to 20 carbon atoms, a cycloaliphatic hydrocarbon radical containing 5 to 8 carbon atoms or an aryl radical containing 6 to 14 carbon atoms, $R_6 = R_1$ or

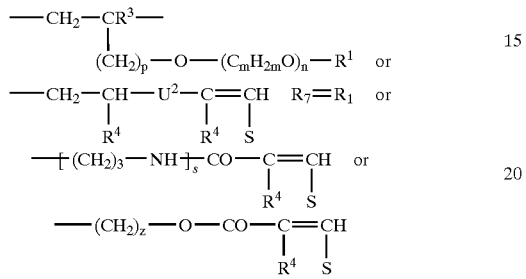

r is 2 to 100, s is 1 or 2, x is 1 to 150, y is 0 to 15 and z is 0 to 4;

iv) 0 to 90 mol % of at least one component of the formula 6a, 6b, or 6c:

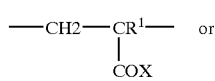  (6a)

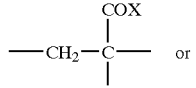  (6b)

  (6c)

wherein M is a hydrogen atom, a mono- or divalent metal cation, an ammonium ion or an organic amine residue, a is 1, or when M is a divalent metal cation a is ½;

wherein X is —OM$_a$,
—O—(C$_m$H$_{2m}$O)$_n$—R$^1$ in which R$^1$ is a hydrogen atom, an aliphatic hydrocarbon radical containing from 1 to 20 carbon atoms, a cycloaliphatic hydrocarbon radical containing 5 to 8 carbon atoms or an optionally hydroxyl, carboxyl, C$_{1-14}$ alkyl, or sulphonic substituted aryl radical containing 6 to 14 carbon atoms, m is 2 to 4, and n is 0 to 100,
—NH—(C$_m$H$_{2m}$O)$_n$—R$^1$,
—NHR$^2$, —N(R$^2$)$_2$ or mixtures thereof in which R$^2$=R$^1$ or —CO—NH$_2$; and
wherein Y is an oxygen atom or —NR$^2$;

j) a copolymer of dicarboxylic acid derivatives and oxyalkylene glycol-alkenyl ethers, comprising:
i) 1 to 90 mol. % of at least one member selected from the group consisting of structural units of formula 7a and formula 7b:

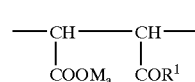  (7a)

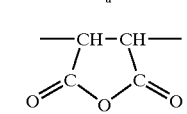  (7b)

wherein M is H, a monovalent metal cation, a divalent metal cation, an ammonium ion or an organic amine;
a is ½ when M is a divalent metal cation or 1 when M is a monovalent metal cation;
wherein R$^1$ is —OM$_a$, or
—O—(C$_m$H$_{2m}$O)$_n$—R$^2$ wherein R$^2$ is H, a C$_{1-20}$ aliphatic hydrocarbon, a C$_{5-8}$ cycloaliphatic hydrocarbon, or a C$_{6-14}$ aryl that is optionally substituted with at least one member selected from the group consisting of [—COOM$_a$, —(SO$_3$)M$_a$, and —(PO$_3$)M$_{a2}$];
m is 2 to 4;
n is 1 to 200;
ii) 0.5 to 80 mol. % of the structural units of formula 8:

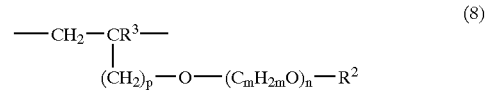  (8)

wherein R$^3$ is H or a C$_{1-5}$ aliphatic hydrocarbon;
p is 0 to 3;
R$^2$ is H, a C$_{1-20}$ aliphatic hydrocarbon, a C$_{5-8}$ cycloaliphatic hydrocarbon, or a C$_{6-14}$ aryl that is optionally substituted with at least one member selected from the group consisting of [—COOM$_a$, —(SO$_3$)M$_a$, and —(PO$_3$)M$_{a2}$];
m is 2 to 4;
n is 1 to 200;
iii) 0.5 to 80 mol. % structural units selected from the group consisting of formula 9a and formula 9b:

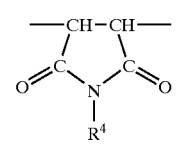  (9a)

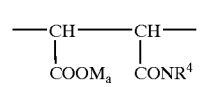  (9b)

wherein R$^4$ is H, C$_{1-20}$ aliphatic hydrocarbon that is optionally substituted with at least one hydroxyl group, —(C$_m$H$_{2m}$O)$_n$—R$^2$, —CO—NH—R$^2$, C$_{5-8}$ cycloaliphatic hydrocarbon, or a C$_{6-14}$ aryl that is optionally substituted with at least one member selected from the group consisting of [—COOM$_a$, —(SO$_3$)M$_a$, and —(PO$_3$)M$_{a2}$];
M is H, a monovalent metal cation, a divalent metal cation, an ammonium ion or an organic amine;
a is ½ when M is a divalent metal cation or 1 when M is a monovalent metal cation;
R$^2$ is H, a C$_{1-20}$ aliphatic hydrocarbon, a C$_{5-8}$ cycloaliphatic hydrocarbon, or a C$_{6-14}$ aryl that is optionally substituted with at least one member selected from the group consisting of [—COOM$_a$, —(SO$_3$)M$_a$, and —(PO$_3$)M$_{a2}$];

m is 2 to 4;
n is 1 to 200;
iv) 1 to 90 mol. % of structural units of formula 10

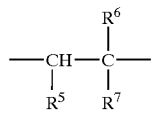
(10)

wherein $R^5$ is methyl, or methylene group, wherein $R^5$ forms one or more 5 to 8 membered rings with $R^7$; $R^6$ is H, methyl, or ethyl;
$R^7$ is H, a $C_{1-20}$ aliphatic hydrocarbon, a $C_{6-14}$ aryl that is optionally substituted with at least one member selected from the group consisting of [—$COOM_a$, —$(SO_3)M_a$, and —$(PO_3)M_{2a}$], a $C_{5-8}$ cycloaliphatic hydrocarbon, —$OCOR^4$, —$OR^4$, or —$COOR^4$, wherein $R^4$ is H, a $C_{1-20}$ aliphatic hydrocarbon that is optionally substituted with at least one —OH, —$(C_mH_{2m}O)_n$—$R^2$, —CO—NH—$R^2$, $C_{5-8}$ cycloaliphatic hydrocarbon, or a $C_{6-14}$ aryl residue that is optionally substituted with a member selected from the group consisting of [—$COOM_a$, —$(SO_3)M_a$, —$(PO_3)M_{a2}$].

61. The method of claim 60, wherein said forming is one of i) placing said unset high early-strength reinforced cementitious composition in a mold and vibrating said mold, ii) allowing the high early-strength reinforced cementitious composition to cure or set into an article, and iii) stripping the cured or set article from said mold.

62. The method of claim 60 wherein a set accelerator is present.

63. The method of claim 62, wherein the set accelerator comprises at least one of:
 a) a nitrate salt of an alkali metal, alkaline earth metal, or aluminum;
 b) a nitrite salt of an alkali metal, alkaline earth metal, or aluminum;
 c) a thiocyanate of an alkali metal, alkaline earth metal or aluminum;
 d) an alkanolamine;
 e) a thiosulfate of an alkali metal, alkaline earth metal, or aluminum;
 f) a carboxylic acid salt of an alkali metal, alkaline earth metal, or aluminum; or
 g) a polyhydroxylalkylamine.

64. The method of claim 60 wherein a set retarder is present.

65. The method of claim 64 wherein the set retarder is at least one of an oxy-boron compound, lignin, a polyphosphonic acid, a carboxylic acid, a hydroxycarboxylic acid, polycarboxylic acid, hydroxylated carboxylic acid, fumaric, itaconic, malonic, borax, gluconic, and tartaric acid, lignosulfonates, ascorbic acid, isoascorbic acid, sulphonic acid-acrylic acid copolymer, and their corresponding salts, polyhydroxysilane, polyacrylamide, carbohydrates or mixtures thereof.

66. The method of claim 60 wherein the hydraulic cement is at least one of portland cement, modified portland cement, masonry cement, or mixtures thereof.

67. The method of claim 60 further including pozzolan that is at least one of diatomaceous earth, opaline cherts, clays, shales, fly ash, silica fume, volcanic tuffs and pumicites, metakaolin, granulated blast furnace slag, fly ash, or mixtures thereof.

68. The method of claim 60 further comprising a cement admixture or additive that is at least one of air detraining agents, water reducers, wetting agents, water soluble polymers, strength enhancing agents, rheology modifying agents, water repellents, dampproofing admixtures, gas formers, permeability reducers, pumping aids, fungicidal admixtures, germicidal admixtures, insecticidal admixtures, finely divided mineral admixtures, alkali-reactivity reducer, bonding admixtures, shrinkage compensation agents, defoamers or aggregate.

69. The method of claim 68 wherein the shrinkage compensation agent is at least one of $RO(AO)_{1-10}H$, wherein R is a $C_{1-5}$ alkyl or $C_{5-6}$ cycloalkyl radical and A is a $C_{2-3}$ alkylene radical, alkali metal sulfates, alkaline earth metal sulfates, or alkaline earth oxides.

70. The method of claim 69 wherein the alkaline earth oxides are at least one of sodium sulfate or calcium oxide.

71. The method of claim 68 wherein the defoamer is at least one of silicones or petroleum oil mixtures.

72. The method of claim 60 wherein the water to cement ratio is about 0.2 to about 0.35.

73. The method of claim 60 wherein the cementitious materials content of the cementitious member is about 800 $lb/yd^3$ to about 1,600 $lb/yd^3$.

74. The method of claim 60 wherein the structural synthetic fibers are at least one of structural plastic fibers, carbon or mixtures thereof.

75. The method of claim 74 wherein the structural plastic fibers are at least one of nylon, polyethylene, polyester, rayon, or mixtures thereof.

76. The method of claim 60 wherein the structural synthetic fibers have a diameter of about 0.6 millimeters to about 1.2 millimeters.

77. The method of claim 60 wherein the structural synthetic fibers have a diameter of about 0.8 millimeters to about 1.0 millimeters.

78. The method of claim 60 wherein the structural synthetic fibers have a length of about 15 millimeters to about 75 millimeters.

79. The method of claim 60 wherein the structural synthetic fibers have a modulus of about 3,000 $N/mm^2$ to about 4,000 $N/mm^2$.

80. The method of claim 60 wherein the structural synthetic fibers have a modulus of about 3,250 $N/mm^2$ to about 3,750 $N/mm^2$.

81. The method of claim 60 wherein the polycarboxylate high range water reducing dispersant has a solids content of about 20% to about 30% and is present in an amount from about 5 to about 35 oz/cwt.

82. The method of claim 60 wherein the primary active ingredient of the polycarboxylate high range water reducing dispersant is about 0.025% to about 0.7% based on dry weight of cement.

83. The method of claim 60 wherein the structural synthetic fiber loadings are about 1% to about 10% by volume of the composition.

84. The method of claim 60 wherein the member is at least one of wall panels, beams or columns.

* * * * *